US011226506B2

(12) United States Patent
Lin et al.

(10) Patent No.: US 11,226,506 B2
(45) Date of Patent: Jan. 18, 2022

(54) HEATER STRUCTURE WITH A GAS-FILLED ISOLATION STRUCTURE TO IMPROVE THERMAL EFFICIENCY IN A MODULATOR DEVICE

(71) Applicant: Taiwan Semiconductor Manufacturing Co., Ltd., Hsin-Chu (TW)

(72) Inventors: Shih-Wei Lin, Taipei (TW); Ming Chyi Liu, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 16/821,160

(22) Filed: Mar. 17, 2020

(65) Prior Publication Data
US 2021/0294130 A1  Sep. 23, 2021

(51) Int. Cl.
*G02F 1/015* (2006.01)
*G02F 1/025* (2006.01)
(Continued)

(52) U.S. Cl.
CPC ............ *G02F 1/025* (2013.01); *G02F 1/225* (2013.01); *G02B 2006/12142* (2013.01);
(Continued)

(58) Field of Classification Search
CPC .... G02F 1/025; G02F 1/225; G02F 2001/212; G02F 2001/0151; G02F 2203/50; G02B 2006/12142
(Continued)

(56) References Cited

U.S. PATENT DOCUMENTS 6,031,957 A * 2/2000 Suzuki ............... G02F 1/011
385/123
6,191,467 B1 * 2/2001 Park .................. H01L 21/764
257/522
(Continued)

FOREIGN PATENT DOCUMENTS

CN       110376766 A      10/2019

OTHER PUBLICATIONS

Gu et al. "Cascaded Uncoupled Dual-Ring Modulator." Optics Letters / vol. 39, No. 16, published Aug. 15, 2014.
(Continued)

*Primary Examiner* — Robert Tavlykaev
(74) *Attorney, Agent, or Firm* — Eschweiler & Potashnik, LLC

(57) ABSTRACT

In some embodiments, the present disclosure relates to a modulator device that includes an input terminal configured to receive impingent light. A first waveguide has a first output region and a first input region that is coupled to the input terminal. A second waveguide is optically coupled to the first waveguide and has second input region and a second output region that is coupled to the input terminal. An output terminal coupled to the first output region of the first waveguide and the second output region of the second waveguide is configured to provide outgoing light that is modulated. A heater structure is configured to provide heat to the first waveguide to induce a temperature difference between the first and second waveguides. A gas-filled isolation structure is proximate to the heater structure and is configured to thermally isolate the second waveguide from the heat provided to the first waveguide.

20 Claims, 19 Drawing Sheets

(51) Int. Cl.
*G02F 1/225* (2006.01)
*G02B 6/12* (2006.01)
*G02F 1/21* (2006.01)

(52) U.S. Cl.
CPC ............ *G02F 1/0151* (2021.01); *G02F 1/212* (2021.01); *G02F 2203/50* (2013.01)

(58) Field of Classification Search
USPC .......................................................... 385/1–3
See application file for complete search history.

(56) References Cited

U.S. PATENT DOCUMENTS

| | | | | |
|---|---|---|---|---|
| 6,847,750 | B1* | 1/2005 | Baumann | G02F 1/011 385/129 |
| 6,870,979 | B2 | 3/2005 | Kawashima | G02B 6/12011 385/14 |
| 6,922,422 | B2* | 7/2005 | Peters | G02B 6/12004 372/34 |
| 6,983,086 | B2* | 1/2006 | Fardi | G02F 1/0147 257/98 |
| 7,038,289 | B2* | 5/2006 | Marty | H01L 21/76232 257/501 |
| 7,339,253 | B2* | 3/2008 | Tsai | H01L 21/76232 257/501 |
| 7,565,038 | B2* | 7/2009 | Earnshaw | G02F 1/0147 385/1 |
| 7,630,596 | B2* | 12/2009 | Watanabe | B81B 3/0081 216/2 |
| 7,920,770 | B2* | 4/2011 | Holzwarth | G02B 6/122 385/129 |
| 8,027,554 | B2* | 9/2011 | Takahashi | G02F 1/0147 385/14 |
| 8,111,724 | B2* | 2/2012 | Assefa | G02B 6/1347 372/43.01 |
| 9,929,181 | B2* | 3/2018 | Kautzsch | H01L 21/764 |
| 10,156,676 | B1* | 12/2018 | Shank | G02B 6/122 |
| 10,224,396 | B1* | 3/2019 | Shank | H01L 29/0649 |
| 10,416,380 | B1* | 9/2019 | Chen | G02B 6/1228 |
| 2004/0026761 | A1* | 2/2004 | Leonardi | H01L 21/76264 257/506 |
| 2004/0062506 | A1 | 4/2004 | Komura et al. | |
| 2004/0264836 | A1* | 12/2004 | Kawashima | G02F 1/025 385/14 |
| 2005/0169566 | A1* | 8/2005 | Takahashi | G02F 1/011 385/1 |
| 2006/0165340 | A1 | 7/2006 | Wu | |
| 2007/0065088 | A1 | 3/2007 | Tanaka et al. | |
| 2010/0111461 | A1* | 5/2010 | Takahashi | G02F 1/0147 385/1 |
| 2011/0292398 | A1 | 12/2011 | Koerkamp et al. | |
| 2013/0134530 | A1* | 5/2013 | Kautzsch | B81C 1/0038 257/417 |
| 2013/0336613 | A1* | 12/2013 | Meade | G02B 6/12 385/14 |
| 2014/0376851 | A1 | 12/2014 | Akiyama | |
| 2015/0263190 | A1* | 9/2015 | Knights | G02F 1/0147 250/201.1 |
| 2015/0340273 | A1* | 11/2015 | Jaffe | G02B 6/1347 257/506 |
| 2016/0181495 | A1* | 6/2016 | Meade | G02F 1/3133 385/14 |
| 2016/0334648 | A1 | 11/2016 | Lu et al. | |
| 2019/0258094 | A1* | 8/2019 | Oh | G02F 1/025 |
| 2019/0369328 | A1 | 12/2019 | Davies et al. | |
| 2021/0132461 | A1* | 5/2021 | Jain | G02F 1/025 |
| 2021/0181546 | A1* | 6/2021 | Yu | G02F 1/0157 |
| 2021/0191163 | A1* | 6/2021 | Oh | G02F 1/025 |

OTHER PUBLICATIONS

Zhou, Zhiping. "Introduction to Silicon Photonics." Peking University, China. Published Jun. 25, 2012.
DeRose et al. "A CMOS Compatible External Heater-Modulator." IEEE 2014 Optical Interconnects Conference, published Aug. 28, 2014.
Fang et al. "Ultralow Power Silicon Photonics Thermo-Optic Switch With Suspended Phase Arms." IEEE Photonics Technology Letters, vol. 23, No. 8, Apr. 15, 2011.
Tsuchizawa et al. "Monolithic Integration of Silicon Photonics Devices for Telecommunications Applications." NTT Technical Review, vol. 9 No. 5 May 2011.
Wikipedia.org "Optical Ring Resonators." Published Jul. 6, 2019.
Lumericial. "PN Depletion Phase Shifter." The date of publication is unknown. Retrieved online on Jan. 31, 2020 from https://support.lumerical.com/hc/en-us/articles/360042328674.
Bogaerts et al. "Silicon Microring Resonators." Laser Photonics Rev. 6, No. 1, 47-73 (2012) / DOI 10.1002/lpor.201100017, published in 2012.
Wikipedia.org "Waveguide" Published on Sep. 3, 2019.
Shafiiha et al. "Wavelength-Tunable Silicon Microring Modulator." Optics Express, published May 2010.

* cited by examiner

HEATER STRUCTURE WITH A GAS-FILLED ISOLATION STRUCTURE TO IMPROVE THERMAL EFFICIENCY IN A MODULATOR DEVICE

BACKGROUND

Optical circuits may comprise multiple photonic functions/devices and optical waveguides. The optical waveguides are configured to confine and guide light from a first point on an integrated chip (IC) to a second point on the IC with minimal attenuation. An optical waveguide in a modulator device may be configured to selectively change the phase, wavelength, frequency, and/or other properties of light that passes through the optical waveguide.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
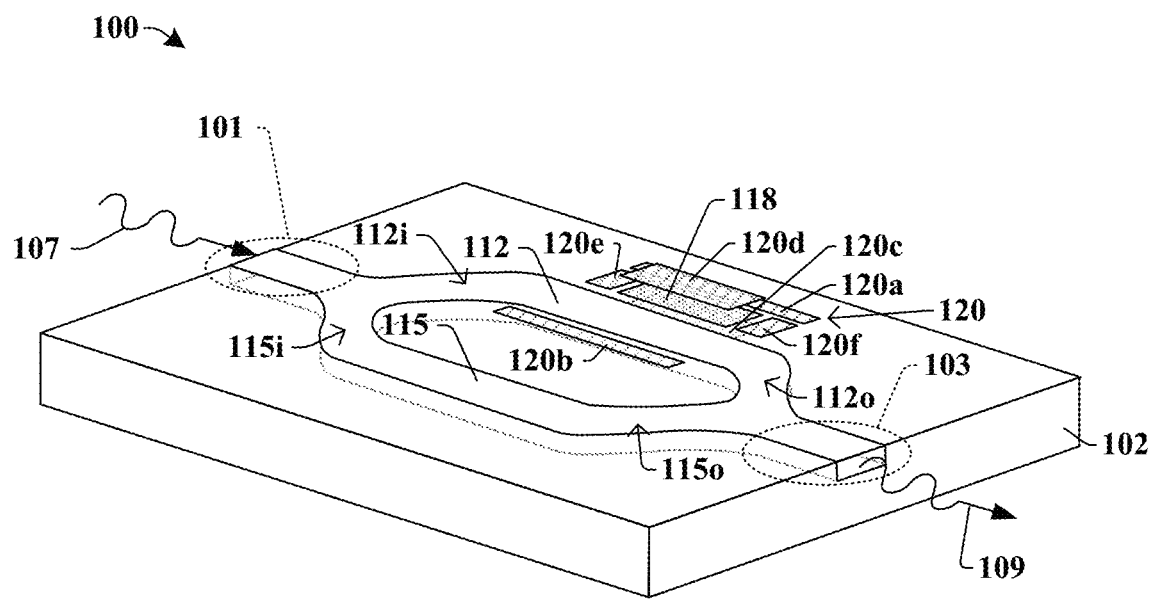
FIG. 1 illustrates a perspective view of some embodiments of a modulator device comprising a heater structure that is laterally between and vertically above a gas-filled isolation structure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In electronics and telecommunications, modulation is the process of varying one or more properties of a periodic waveform in a manner that allows information to be transmitted from a transmitter to a receiver. For example, amplitude modulation (AM), frequency modulation (FM), and phase modulation can be used to modulate the periodic waveform to convey the information over long or short distances.

FIG. 1 illustrates a modulator device 100 in accordance with some embodiments. The modulator device 100 includes an input terminal 101 and an output terminal 103. A first waveguide 112 and a second waveguide 115 branch off from the input terminal 101, and then recombine at the output terminal 103, thereby providing two pathways or channels through which light can travel through the modulator device. In some embodiments, the first and second waveguides 112, 115 branch off symmetrically between the input terminal 101 and the output terminal 103. The first waveguide 112 may be in close proximity to or in direct contact with the second waveguide 115, such that the first and second waveguides 112, 115 are optically coupled to one another. More particularly, the first waveguide 112 may have a first input region 112i coupled to the input terminal 101 and a first output region 112o coupled to the output terminal 103. The second waveguide 115 may have a second input region 115i coupled to the input terminal 101 and a second output region 115o coupled to the output terminal 103.

In some embodiments, impingent light 107 is received at the input terminal 101 with an initial phase, and is then split to pass along the first waveguide 112 and the second waveguide 115, before being recombined and provided as outgoing light 109 at the output terminal 103. Because the first waveguide 112 and second waveguide 115 are optically coupled, the outgoing light 109 can be phase shifted due to constructive or destructive interference arising from the first and second waveguides 112, 115. For example, in some embodiments, a heater structure 118 is arranged over, under, and/or alongside the first waveguide 112 to generate and apply heat to the first waveguide 112. This heat can induce a change in temperature of the first waveguide 112, which in turn changes the refractive index, carrier mobility, and/or other characteristics of the first waveguide 112, relative to that of the second waveguide 115. Thus, the velocity and/or phase of the light traveling through the first waveguide 112 can be shifted relative to that of the light travelling through the second waveguide 115, such that the temperature of the heater structure 118 can control a phase shift imparted to the outgoing light 109 at the output terminal 103. Thus, the modulator device 100 can control the temperature of the heater structure 118 in time based on data states that are to be transmitted in time, such that the impingent light 107 is modulated to provide outgoing light 109 whose modulation corresponds to various data states to be transmitted. It will be appreciated that although a modulation example that makes use of phase modulation is described above, in other embodiments other types of modulation, such as amplitude modulation or frequency modulation for example, could also be used.

Although the heater structure 118 may allow for the impingent light 107 to be modulated in a controllable manner, the heat generated by the heater structure 118 may also disseminate to undesirably heat the second waveguide 115, thereby limiting the desired modulation (e.g., phase shift). The heat dissemination may also impact surrounding layers in the modulator device, reduce thermal efficiency, reduce control of the modulator device, and/or increase power consumption of the modulator device.

Therefore, in various embodiments of the present disclosure, a gas-filled isolation structure 120 is arranged proximate to the first waveguide 112 to localize heat generated by the heater structure 118 to the first waveguide 112. The gas-filled isolation structure 120 comprises a cavity filled with air, vacuum, and/or another gas, and is embedded in a substrate 102 and/or dielectric layers of the modulator device to surround outer sidewalls of the heater structure 118, and/or in some embodiments, a top and/or bottom surface of the first waveguide 112. The gas-filled isolation structure 120 increases thermal efficiency, increases control, and/or decreases power consumption of the modulator device.

In the illustrated embodiment of FIG. 1, the gas-filled isolation structure 120 can include a first sidewall portion 120a arranged to a first side of the heater structure 118 and/or a second sidewall portion 120b arranged to a second side of the heater structure 118. The gas-filled isolation structure 120 can also include a lower portion 120c arranged under a lower surface of the heater structure 118 and/or an upper portion 120d arranged over an upper surface of the heater structure 118. The gas-filled isolation structure 120 can also include a first end portion 120e arranged to a first end of the heater structure 118 and/or a second end portion 120f arranged to a second end of the heater structure 118. In some embodiments, these portions 120a-120f can be separate from one another, but in other embodiments these portions 120a-120f can be merged into one or more cavities or chambers that partially or fully surround the heater structure 118. Thus, the gas-filled isolation structure 120 comprises a gas-filled chamber, and the gas-filled isolation structure 120 separates the heater structure 118 and the second waveguide 115 but does not separate the heater structure 118 and the first waveguide 112. This can improve thermal isolation between the first and second waveguides 112, 115, and can also help mitigate other heating issues within the modulator device.

Figure 2A:
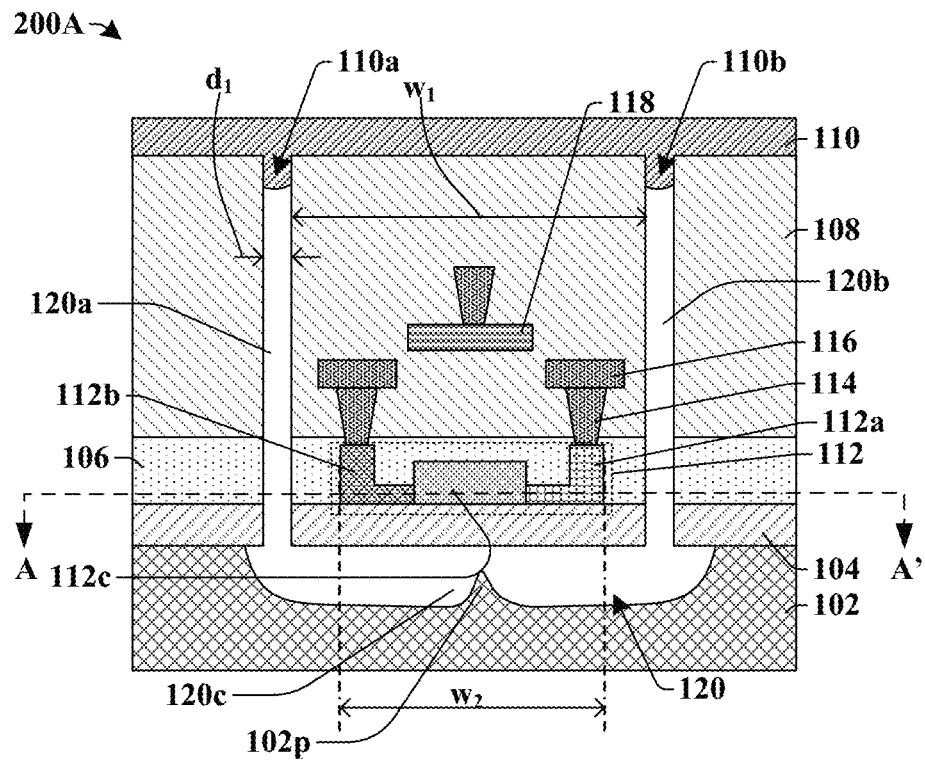
FIG. 2A illustrates a cross-sectional view of some additional embodiments of a modulator device comprising a heater structure that is laterally between and vertically above a gas-filled isolation structure.

FIG. 2A illustrates a cross-sectional view 200A of some embodiments of a modulator device comprising a heater structure laterally between and vertically above a gas-filled isolation structure.

The modulator device in the cross-sectional view 200A comprises a first waveguide 112 disposed over a substrate 102. In some embodiments, a bulk dielectric layer 104 may be arranged over the substrate 102, and an oxide layer 106 may be arranged over the bulk dielectric layer 104. In some embodiments, the first waveguide 112 is arranged directly over the bulk dielectric layer 104 and laterally surrounded by the oxide layer 106. In some embodiments, the first waveguide 112 comprises a semiconductor material (e.g., silicon) configured to confine and transport light. The first waveguide 112 may have an active region comprising a p-type side 112a (e.g., p-doped silicon) laterally next to an n-type side 112b (e.g., n-doped silicon). In some embodiments, a center undoped region 112c (e.g., undoped silicon) may separate the p-type side 112a from the n-type side 112b. In some embodiments, the p-type side 112a and the n-type side 112b may have topmost surfaces that are above the center undoped region 112c, whereas in other embodiments, topmost surfaces of the p-type side 112a and the n-type side 112b may be below (e.g., FIG. 2B) or about at a same height as a topmost surface of the center undoped region 112c of the first waveguide 112. The p-type side 112a and the n-type side 112b are each coupled to interconnect vias 114 and interconnect wires 116 embedded in a first dielectric structure 108. In some embodiments, through the interconnect vias 114 and the interconnect wires 116, a bias is applied across the p-type side 112a and the n-type side 112b of the first waveguide 112 in a first direction to change the phase of light traveling through the active region of the first waveguide 112, wherein the light travels in a second direction perpendicular to the first direction.

Further, in the cross-sectional view 200A, the modulator device comprises a heater structure 118 that directly overlies the first waveguide 112. The heater structure 118 is embedded within the first dielectric structure 108, and in some embodiments, is between the interconnect vias 114 and the interconnect wires 116. The heater structure 118 may comprise a material that generates heat upon an applied signal (e.g., voltage, current), such as, for example, titanium nitride, tantalum nitride, tungsten, doped silicon, silicide, or the like. It will be appreciated that other materials for the heater structure 118 are also within the scope of this disclosure. The heater structure 118 is configured to apply heat to the first waveguide 112 to change the refractive index of the first waveguide 112, thereby changing the phase of the light as it travels through the active region of the first waveguide 112. During operation, the change in the phase of light depends on the change of temperature of the waveguide by the following, first equation:

$$\Delta \varphi = \frac{2\pi * \frac{dn}{dT} * \Delta T * L}{\lambda},$$

wherein $$\frac{dn}{dT}$$

is the thermo-optic coefficient of the material of the first waveguide 112, ΔT is the change in temperature of the first waveguide 112, L is the length that the light travels when exposed to the heater structure 118, and λ is the wavelength of light. For example, in some embodiments, the first waveguide 112 comprises silicon, which has a thermo-optic coefficient of about $1.86 \times 10^{-4}$ per Kelvin, which indicates that the refractive index of silicon changes by $1.1 \times 10^{-3}$ for every 6 Kelvin (or 6 degrees Celsius) temperature change.

A gas-filled isolation structure 120 may be arranged below and beside the heater structure 118 in the cross-sectional view 200A. The gas-filled isolation structure 120 is a cavity filled with trapped air, vacuum, and/or another gas within the first dielectric structure 108, the oxide layer 106, the bulk dielectric layer 104, and the substrate 102. Thus, bottom surfaces of the gas-filled isolation structure 120 are defined by the substrate 102. In some embodiments, the gas-filled isolation structure 120 may comprise a first sidewall portion 120a and a second sidewall portion 120b, each of which have top surfaces defined by a sealing layer 110. The heater structure 118 is arranged between the first and second sidewall portions 120a, 120b of the gas-filled isolation structure 120. In some embodiments, the gas-filled isolation structure 120 also comprises a lower portion 120c that is directly between the bulk dielectric layer 104 and the substrate 102, directly underlies the heater structure 118, and connects the first sidewall portion 120a of the gas-filled isolation structure 120 to the second sidewall portion 120b of the gas-filled isolation structure 120. In some embodiments, because of the formation of the lower portion 102c of the gas-filled isolation structure 120, the substrate 102 comprises a peak 102p arranged between the first and second sidewall portions 120a, 120b of the gas-filled isolation structure 120. In some embodiments, the peak 102p contacts the bulk dielectric layer 104 such that the lower portion 102c does not connect the first sidewall portion 120a to the second sidewall portion 120b of the gas-filled isolation structure 120.

In the cross-sectional view 200A, the first sidewall portion 120a and the second sidewall portion 120b of the gas-filled isolation structure 120 each have a width equal to a first distance $d_1$. In some embodiments, the first distance $d_1$ may be equal to at most 0.5 micrometers. It will be appreciated that other values for the first distance $d_1$ are also within the scope of this disclosure. Further, the first sidewall portion 120a may be separated by the second sidewall portion 120b by a first width $w_1$, wherein the first width $w_1$ is measured between innermost sidewalls of the first and second sidewall portions 120a, 120b. The first width $w_1$ is greater than a second width $w_2$, wherein the second width $w_2$ is equal to the width of the first waveguide 112 in the cross-sectional view 200A. Thus, the first waveguide 112 is arranged between the gas-filled isolation structure 120.

The sealing layer 110 may define the top surfaces of the gas-filled isolation structure 120. In some embodiments, the sealing layer 110 comprises an oxide, such as undoped silicate glass, for example. It will be appreciated that other materials for the sealing layer 110 are also within the scope of this disclosure. The sealing layer 110, in some embodiments, has bottommost surfaces that are below a topmost surface of the first dielectric structure 108. In such embodiments, the sealing layer 110 may comprise a first protrusion 110a that defines a topmost surface of the first sidewall portion 120a of the gas-filled isolation structure 120, and a second protrusion 110b that defines a topmost surface of the second sidewall portion 120b of the gas-filled isolation structure 120. In some embodiments, the first and second protrusions 110a, 110b of the sealing layer 110 may have bottom surfaces that are concave up in the cross-sectional view 200A with respect to the first direction.

The gas-filled isolation structure 120 laterally surrounds the heater structure 118 and the first waveguide 112, such that heat generated by the heater structure 118 is confined to the first waveguide 112. Thus, compared to a modulator device with a heater structure 118 without a gas-filled isolation structure 120, a modulator device that comprises a heater structure 118 surrounded by a gas-filled isolation structure 120 may be more thermally efficient because of heat confinement, have a lower power consumption because of the efficient use of the heater structure 118, and be more reliable because thermal damage to other components of the modulator device may be prevented.

Figure 2B:
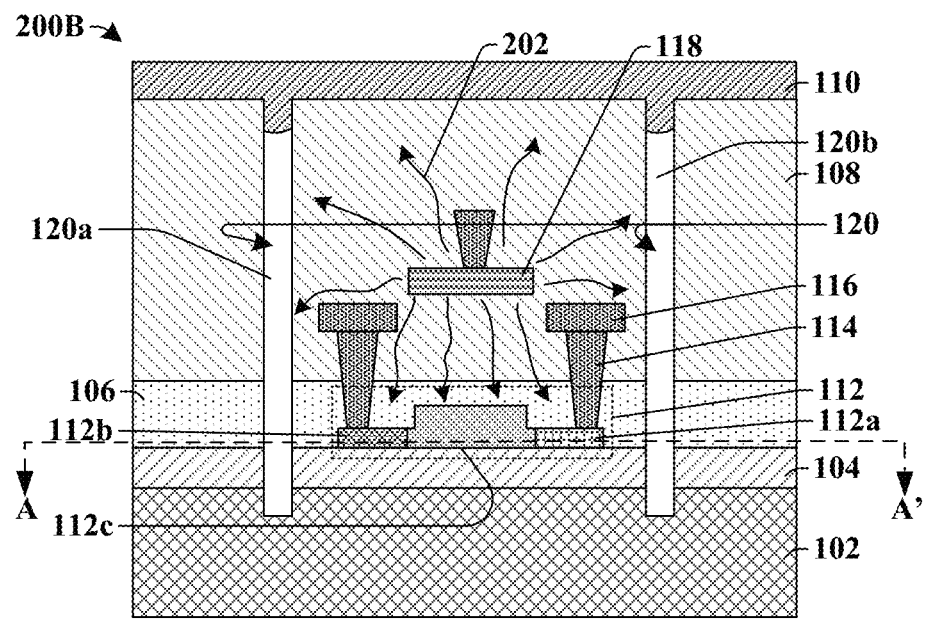
FIG. 2B illustrates a cross-sectional view of some additional embodiments of a modulator device comprising a heater structure that is laterally between a gas-filled isolation structure.

FIG. 2B illustrates a cross-sectional view 200B of some embodiments of a modulator device comprising a heater structure laterally between a gas-filled isolation structure.

The modulator device in the cross-sectional view 200B of FIG. 2B illustrates an alternative embodiment of a gas-filled isolation structure 120 that surrounds a heater structure 118 and a first waveguide 112, wherein the gas-filled isolation structure 120 comprises a first sidewall portion 120a and a second sidewall portion 120b, without a lower portion (120c of FIG. 2A). Thus, in some embodiments, the gas-filled isolation structure 120 does not directly underlie the heater structure 118 and/or the first waveguide 112. It will be appreciated in the method illustrated in FIGS. 8A, 8B, 9, 10, 11A-D, and 12-17, that in some embodiments, the first and second sidewall portions 120a, 120b of the gas-filled isolation structure 120 are formed before the lower portion (120c of FIG. 2A) of the gas-filled isolation structure 120. Thus, in some embodiments, the lower portion (120c of FIG. 2A) is omitted to save time and resources during manufacturing. However, the gas-filled isolation structure 120 of FIG. 2A may provide more thermal efficiency than the gas-filled isolation structure 120 of FIG. 2B because the lower portion (120c of FIG. 2A) of the gas-filled isolation structure 120 may provide more thermal isolation between the first waveguide 112 and the substrate 102.

Further, the cross-sectional view 200B of FIG. 2B comprises exemplary heat waves 202 generated by the heater structure 118 during operation of the modulator device. As illustrated, the exemplary heat waves 202 may be insulated by the gas-filled isolation structure 120, thereby allowing the exemplary heat waves 202 to reach the first waveguide 112 more efficiently.

Figure 3A:
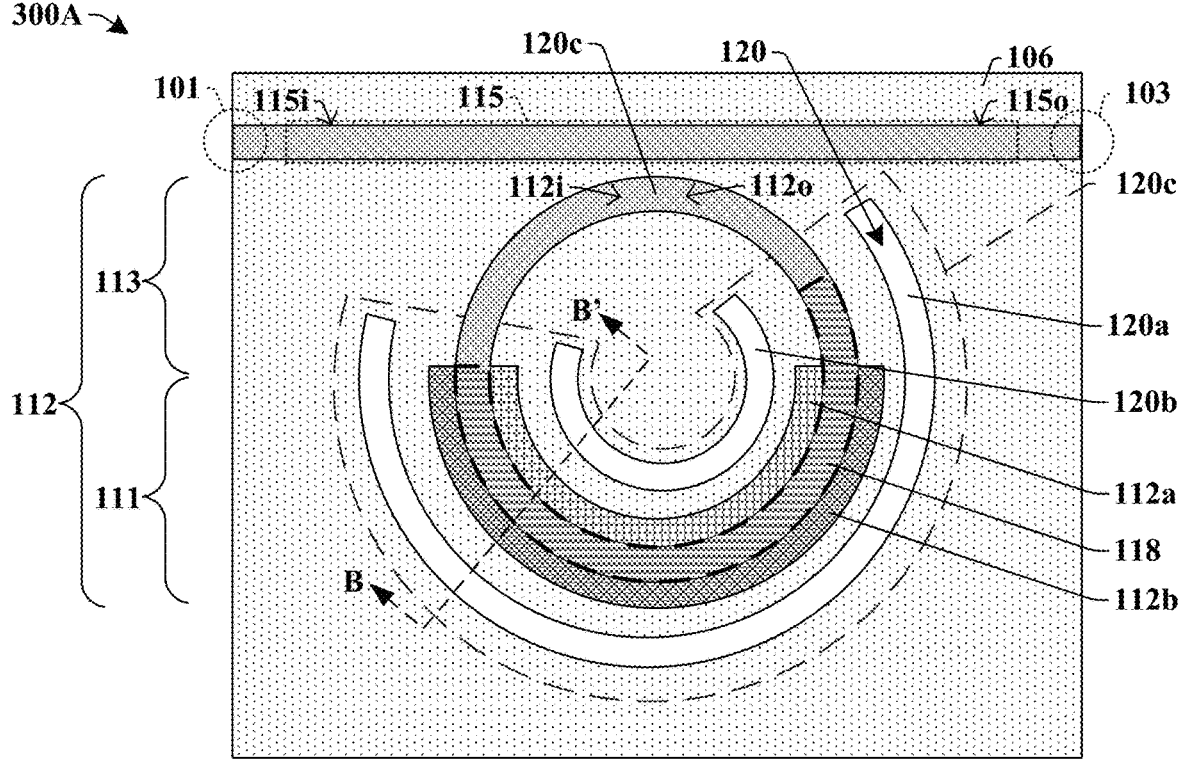
FIGS. 3A-C illustrate top-views of some embodiments of a modulator device comprising a gas-filled isolation structure having a first sidewall portion on a first side of a heater structure and a second sidewall portion on a second side of the heater structure.

FIG. 3A illustrates a top-view 300A corresponding to some embodiments of a gas-filled isolation structure having a first sidewall portion and a second sidewall portion that are each a continuous cavity.

The top-view 300A of FIG. 3A (and the top-views 300B, 300C, and 500A of FIGS. 3B, 3C, and 5A, respectively) may correspond to some embodiments of the cross-section line AA' in FIGS. 2A and 2B. The heater structure 118 is illustrated in the top-view 300A with a dotted outline to acknowledge that the heater structure 118 would not be visible in a top-view based on the cross-section lines AA' of FIGS. 2A and 2B. Additionally, it will be appreciated that the substrate (102 of FIG. 2A) would be visible in the top-view 300A through the first and second sidewall portions 120a and 120b of the gas-filled isolation structure 120 because the gas-filled isolation structure 120 is filled with air. However, for simplicity, the gas-filled isolation structure 120 is illustrated as a white cavity in the top-view 300A. Further, the cross-sectional views 200 and 250 of FIGS. 2A and 2B, respectively, may each be taken from cross-section line BB' of FIG. 3A, in some embodiments.

The first waveguide 112, in some embodiments, resembles a ring-like structure from the top-view 300A. An active region 111 of the first waveguide 112 may comprise the heater structure 118, and the p-type side 112a, the n-type side 112b, and the center undoped region 112c of the first waveguide 112. The active region 111 may be continuously connected with an inactive region 113 that comprises, in some embodiments, the center undoped region 112c. Further, the modulator device in the top-view 300A may comprise a second waveguide 115. The second waveguide 115, in some embodiments, may comprise a same semiconductor material as the center undoped region 112c of the first waveguide 112. The second waveguide 115 may be substantially straight such that input terminal 101, the second waveguide 115, and the output terminal 103 are collinear along a line within a plane, in some embodiments. In other embodiments, the second waveguide 115 may comprise some curved portions, for example. The second waveguide 115 is configured to confine and transport light. The second waveguide 115 is arranged laterally beside the first waveguide 112, and in some embodiments, the first and second waveguides 112, 115 are arranged close enough to one another such that although they are not directly contacting one another, the first and second waveguides 112, 115 are optically coupled to one another. In some embodiments, it is the inactive region 113 of the first waveguide 112 that is closest to the second waveguide 115. Thus, the heater structure 118 and the gas-filled isolation structure 120 do not interfere with the optical coupling directly between the inactive region 113 of the first waveguide 112 and the second waveguide 115.

In some embodiments, from the top-view 300A, the first sidewall portion 120a of the gas-filled isolation structure 120 is a continuous cavity. The first sidewall portion 120a may have an overall arc-like shape because the first waveguide 112 is a ring-like structure. In some embodiments, from the top-view 300A, the second sidewall portion 120b of the gas-filled isolation structure 120 may also be a continuous cavity. The second sidewall portion 120b may have an overall arc-like shape because the first waveguide 112 is a ring-like structure. The first and second sidewall portions 120a, 120b of the gas-filled isolation structure 120 continuously surround a first side and a second side of the heater structure 118, in some embodiments. The first sidewall portion 120a nor the second sidewall portion 120b of the gas-filled isolation structure 120 are continuous circles in the top-view 300A so that the gas-filled isolation structure 120 does not interfere with the optical coupling between the first and second waveguides 112, 115. In some embodiments, such as the modulator device of FIG. 2A, the gas-filled isolation structure 120 comprises the lower portion 120c. The lower portion 120c is represented by a dashed line in the top-view 300A, as it underlies the oxide layer 106. The lower portion 120c may also, in some embodiments, be a continuous cavity and have an overall arc-like shape. In other embodiments, such as the modulator device of FIG. 2B, the lower portion 120c of the gas-filled isolation structure 120 may be omitted.

Figure 3B:
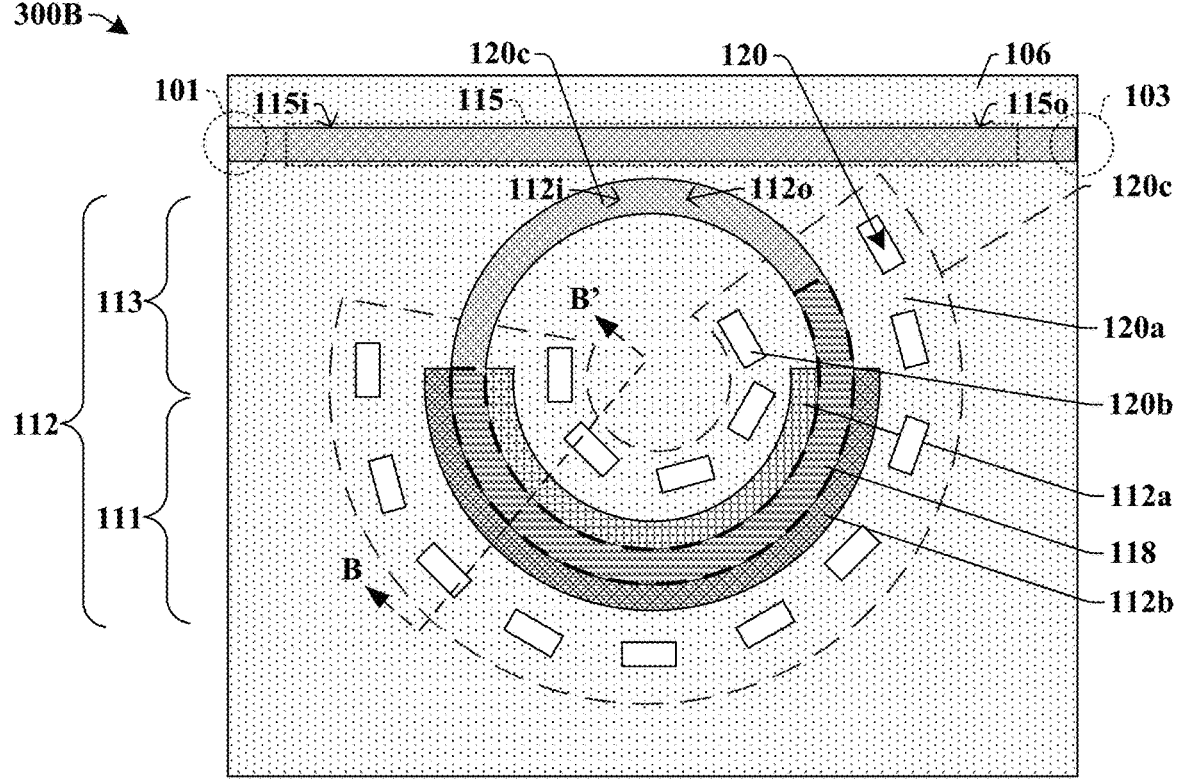

FIG. 3B illustrates a top-view 300B corresponding to some alternative embodiments of the top-view 300A of FIG. 3A.

In some embodiments, from the top-view 300B, the first and second sidewall portions 120a, 120b of the gas-filled isolation structure 120 each portion comprises multiple rectangular-shaped cavities. Thus, in some embodiments, the first sidewall portion 120a of the gas-filled isolation structure 120 is not a continuously connected cavity from the top-view 300B, and the second sidewall portion 120b of the gas-filled isolation structure 120 is not a continuously connected cavity. Each of the rectangular-shaped cavities may be spaced apart from one another by the oxide layer 106. In some embodiments, although the first and second sidewall portions 120a, 120b are discontinuous, the lower portion 120c of the gas-filled isolation structure 120 may be a continuously connected cavity in the substrate (102 of FIG. 2A). In other embodiments (not shown), the lower portion 120c of the gas-filled isolation structure 120 may comprise multiple cavities separated from one another by the substrate (102 of FIG. 2A).

Figure 3C:
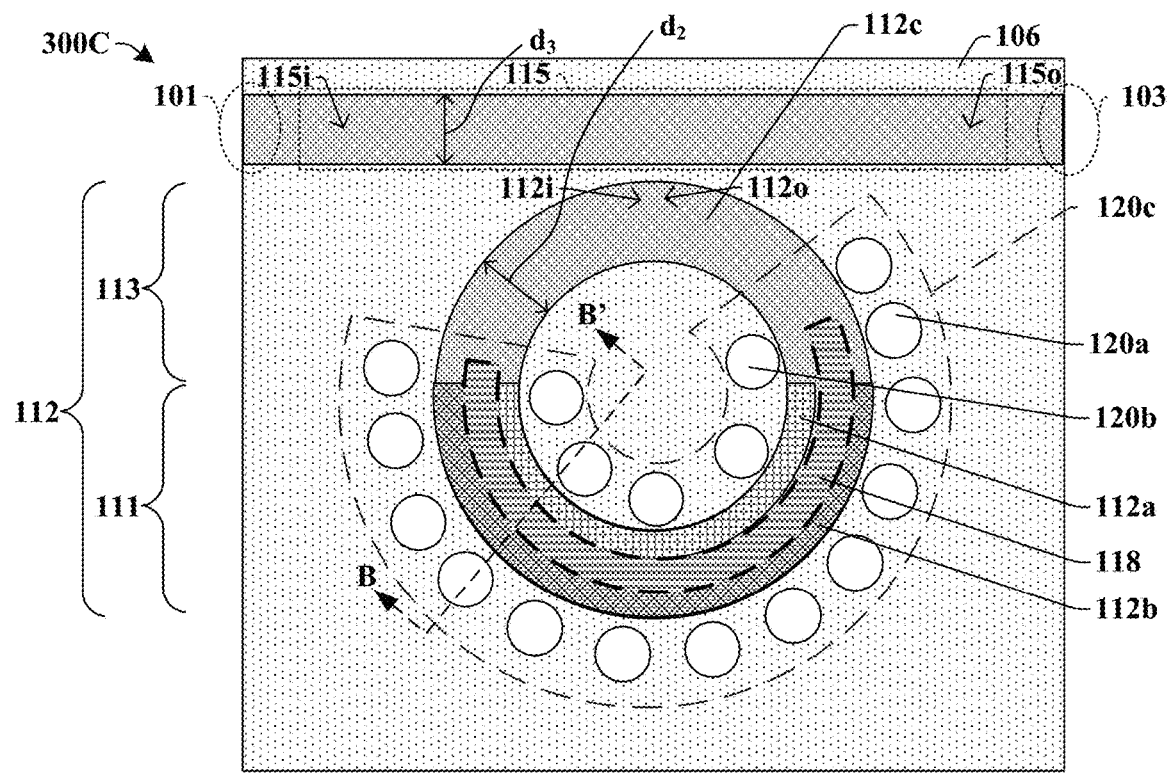

FIG. 3C illustrates a top-view 300C corresponding to some alternative embodiments of the top-view 300A of FIG. 3A.

In some embodiments, from the top-view 300C, the first and second sidewall portions 120a, 120b of the gas-filled isolation structure 120 each portion comprises multiple and/or a plurality of circular-shaped cavities. Thus, in some embodiments, the first sidewall portion 120a of the gas-filled isolation structure 120 is not a continuously connected cavity from the top-view 300C, and the second sidewall portion 120b of the gas-filled isolation structure 120 is not a continuously connected cavity. Each of the circular-shaped cavities may be spaced apart from one another by the oxide layer 106. In some embodiments, although the first and second sidewall portions 120a, 120b are discontinuous, the lower portion 120c of the gas-filled isolation structure 120 may be a continuously connected cavity in the substrate (102 of FIG. 2A). In other embodiments (not shown), the lower portion 120c of the gas-filled isolation structure 120 may comprise multiple cavities separated from one another by the substrate (102 of FIG. 2A).

Further, in some embodiments, the first waveguide 112 has a width equal to a second distance $d_2$ that is constant when measured throughout the ring-like structure. In other embodiments, the second distance $d_2$ may vary throughout the ring-like structure. For example, in the top-view of FIG. 3B, the inactive region 113 is narrower than the active region 111 of the first waveguide 112. Thus, in such other embodiments, the second distance $d_2$ is larger when measured on the active region 111 of the first waveguide 112 than the second distance $d_2$ when measured on the inactive region 113 of the first waveguide 112. In some embodiments, the second waveguide 302 has a width from the top-view 300C equal to a third distance $d_3$. In some embodiments, the third distance $d_3$ is about equal to the second distance $d_2$. In other embodiments, the third distance $d_3$ may be greater than or less than the second distance $d_2$.

In some embodiments, the gas-filled isolation structure 120 in the top-view 300A of FIG. 3A may provide the most thermal efficiency for a modulator device comprising a heater structure 118; however, in other embodiments, the gas-filled isolation structure 120 of the top-view 300B of FIG. 3B and/or the top-view 300C of FIG. 3C may be used due to other factors (e.g., mechanical properties, electrical properties, optical properties, etc.) of the device design. Decreasing the space between the cavities of each sidewall portion (e.g., 120a or 120b) of the gas-filled isolation structure 120 would increase the thermal efficiency of the gas-filled isolation structures 120 illustrated in the top-view 300B of FIG. 3B and the top-view 300C of FIG. 3C.

Figure 4:
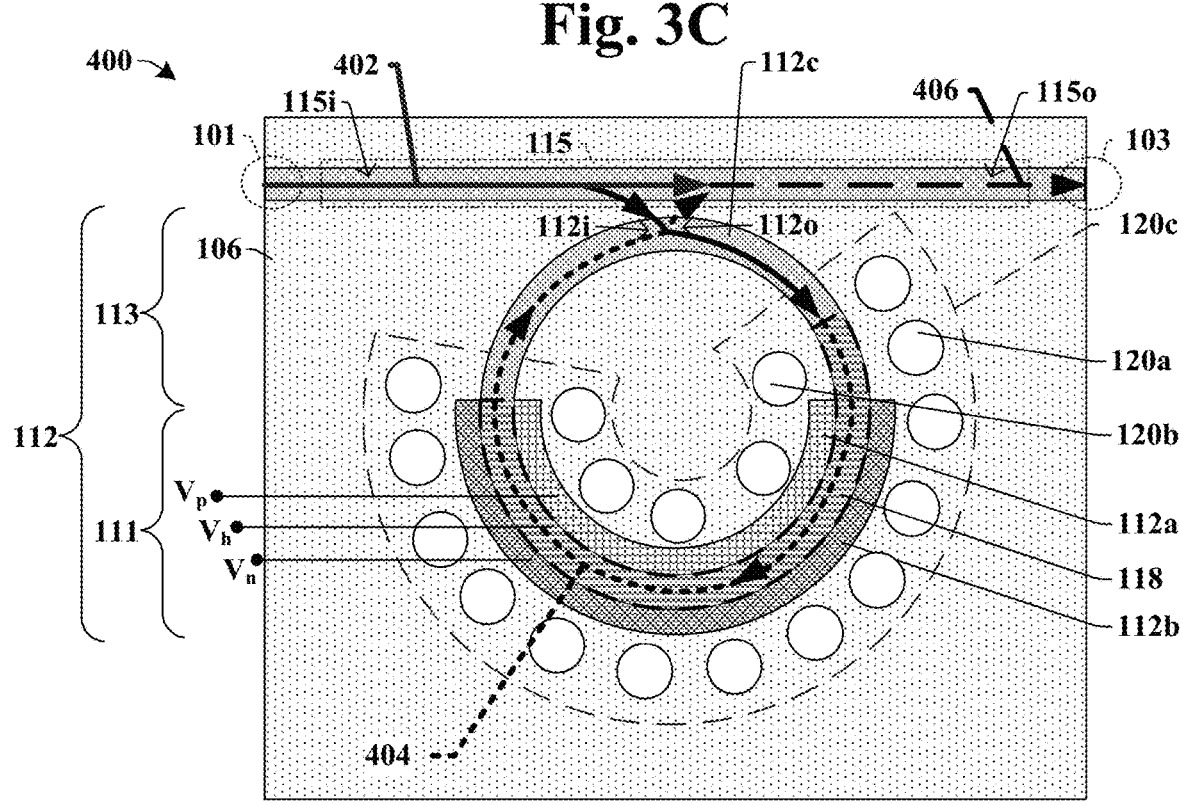
FIG. 4 illustrates a top-view of some embodiments of an exemplary light path traveling through a modulator device comprising a heater structure surrounded by a gas-filled isolation structure.

FIG. 4 illustrates a top-view 400 of some embodiments of an exemplary light path passing through a modulator device comprising a heater structure laterally between a gas-filled isolation structure.

In some embodiments, during operation of a modulator device, light having a first phase travels through a first exemplary light pathway 402 along the second waveguide 115. The first exemplary light pathway 402 may travel into the inactive region 113 of the first waveguide 112 through the first input region 112i because the first and second waveguides 112, 115 are optically coupled. The light may then enter a second exemplary light pathway 404, wherein voltage may be selectively applied across a p-terminal $V_p$ and the n-terminal $V_n$ coupled to the p-type side 112a and the n-type side 112b, respectively, of the first waveguide 112 and/or the heater terminal $V_h$ coupled to the heater structure 118 such that in active region 111 of the first waveguide 112, the light changes from the first phase to a second phase. As the light travels along the second exemplary light pathway 404, the gas-filled isolation structure 120 insulates the heat generated by the heater structure 118 and confines the heat to the active region 111 of the first waveguide 112 such that the first phase may change to the second phase accurately and efficiently. The light in the second exemplary light pathway 404 may then exit the inactive region 113 of the first waveguide 112 through the first output region 112o and combine with the first exemplary light pathway 402, in some embodiments, to enter a third exemplary light pathway 406, wherein the light has a third phase due to constructive and/or destructive interference between light traveling through the first and second exemplary light pathways 402, 404. Thus, when the active region 111 of the first waveguide 112 is "ON" (e.g., voltages applied to $V_p$, $V_n$, and/or $V_h$), light may be selectively changed or modulated according to the voltages applied to $V_p$, $V_n$, and/or $V_h$ from a first phase to a third phase to transmit digital data through optical signals.

Figure 5A:
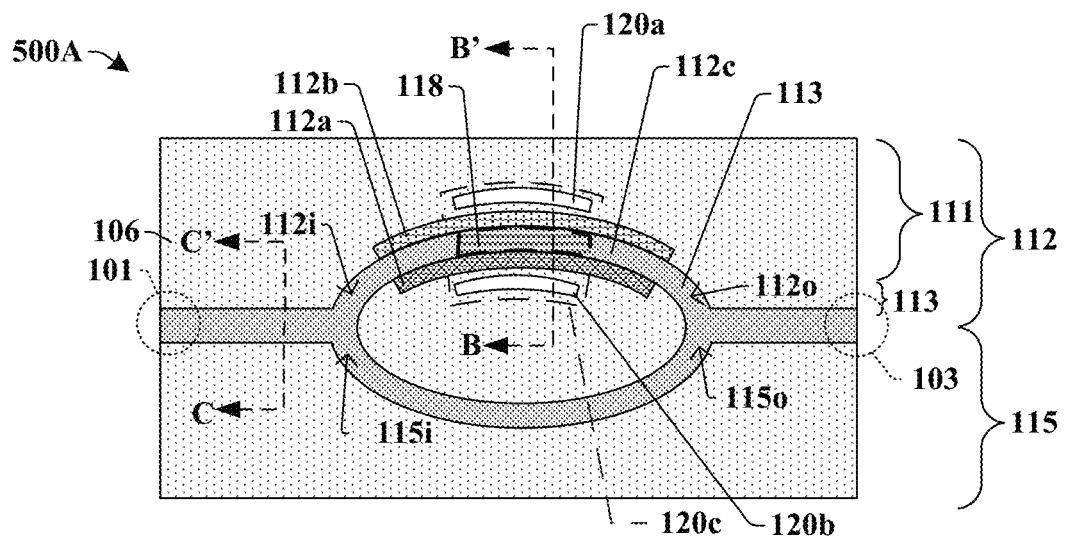
FIG. 5A illustrates a top-view of some embodiments of a modulator device comprising a heater structure surrounded by a gas-filled isolation structure, wherein a first and second waveguide are directly connected with one another.

FIG. 5A illustrates a top-view 500A of some embodiments of a modulator device comprising a gas-filled isolation structure, wherein a first and second waveguide are directly connected.

In some embodiments, the first waveguide 112 directly contacts the second waveguide 115. For example, in the top-view 500A, the first waveguide 112 may have an overall arc-like shape. The active region 111 of the first waveguide 112 may comprise the p-type side 112a, the n-type side 112b, the center undoped region 112c, and the heater structure 118. Thus, the active region 111 of the first waveguide 112 may also be arranged between a first sidewall portion 120a and a second sidewall portion 120b of a gas-filled isolation structure 120 to prevent heat generated by the heater structure 118 from effecting light traveling through the second waveguide 115 and through the inactive region 113 of the first waveguide 112. In some embodiments, the first and second sidewall portions 120a, 120b of the gas-filled isolation structure 120 may each be a continuously connected cavity. In other embodiments (e.g., FIGS. 3B and 3B), the first and/or second sidewall portions 120a, 120b of the gas-filled isolation structure 120 may each comprise multiple rectangular-shaped cavities or multiple circular-shaped cavities.

Figure 5B:
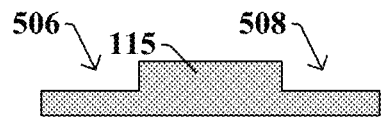
FIGS. 5B and 5C illustrate cross-sectional views of some embodiments of a first and/or second waveguide in a modulator device.
Figure 5C:
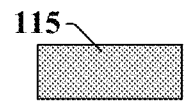

FIGS. 5B and 5C illustrate cross-sectional views 500B and 500C of some embodiments of a second waveguide in a modulator device. In some embodiments, the cross-sectional views 500B and 500C of FIGS. 5B and 5C, respectively, may be taken from cross-section line CC' of FIG. 5A.

As illustrated in the cross-sectional view 500B of FIG. 5B, in some embodiments, the second waveguide 115 comprises a first peripheral portion 506 and a second peripheral portion 508. The first and second peripheral portions 506, 508 may have upper surfaces that are below a topmost surface of the second waveguide 115. The second waveguide 115, in some embodiments, comprises an undoped semiconductor material (e.g., undoped silicon). In some embodiments, the first waveguide 112 also has a same cross-sectional view as the second waveguide 115. In such embodiments, in the active region 111 of the first waveguide 112, the first peripheral portion 506 may be doped to form the p-type side (112a of FIG. 5A) and the second peripheral portion 508 may be doped to form the n-type side (112b of FIG. 5A).

As illustrated in the cross-sectional view 500C of FIG. 5C, in some embodiments, the second waveguide 115 is free of peripheral portions or protrusions and may resemble, for example, an overall rectangular shape. In some embodiments, the second waveguide 115 and the inactive region 113 of the first waveguide 112 may resemble the cross-sectional view 500C of FIG. 5C, whereas the active region 111 of the first waveguide 112 may resemble the cross-sectional view 500B of FIG. 5B with the p-type side (112a of FIG. 5A) and the n-type side (112b of FIG. 5A).

Figure 6:
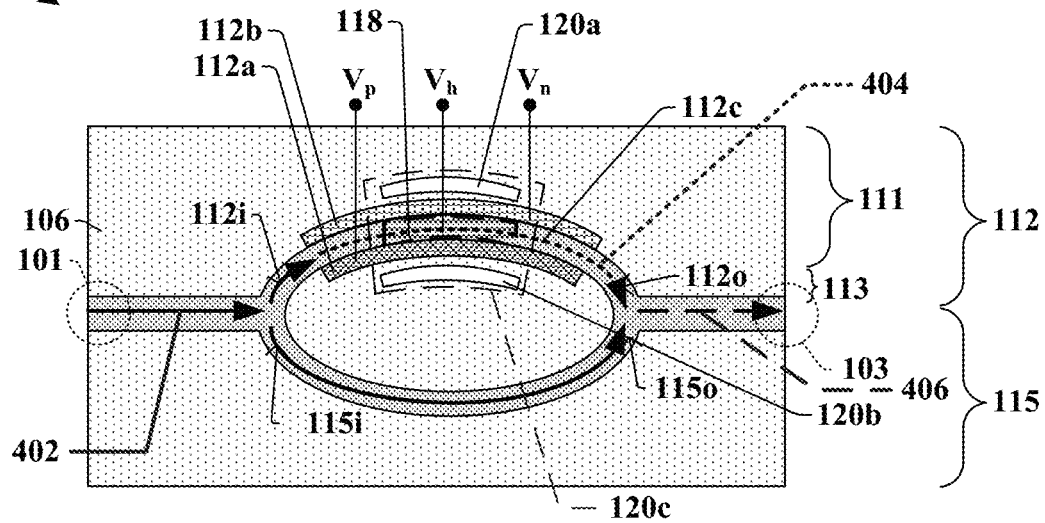
FIG. 6 illustrates a top-view of some embodiments of an exemplary light path traveling through a modulator device comprising a heater structure surrounded by a gas-filled isolation structure, and a first waveguide directly contacting a second waveguide.

FIG. 6 illustrates a top-view 600 of some embodiments of an exemplary light path passing through the modulator device of FIG. 5A.

In some embodiments, during operation of a modulator device, light having a first phase travels through a first exemplary light pathway 402 along the second waveguide 115. The first exemplary light pathway 402 may travel into the inactive region 113 of the first waveguide 112 through the first input region 112i because the first and second waveguides 112, 115 directly contact one another, and thus, are optically coupled. The light may then enter a second exemplary light pathway 404, wherein voltage may be applied across a p-terminal $V_p$ and the n-terminal $V_n$ coupled to the p-type side 112a and the n-type side 112b, respectively, of the first waveguide 112 and/or the heater terminal $V_h$ coupled to the heater structure 118 such that in active region 111 of the first waveguide 112, the light changes from the first phase to a second phase. As the light travels along the second exemplary light pathway 404, the gas-filled isolation structure 120 insulates the heat generated by the heater structure 118 and confines the heat to the active region 111 of the first waveguide 112 such that the first phase may change to the second phase accurately and efficiently. The light in the second exemplary light pathway 404 may then exit the inactive region 113 of the first waveguide 112 at the first output region 112o and combine with the first exemplary light pathway 402, in some embodiments, to enter a third exemplary light pathway 406, wherein the light has a third phase due to constructive and/or destructive interference between light traveling through the first and second exemplary light pathways 402, 404. Thus, when the active region 111 of the first waveguide 112 is "ON" (e.g., voltages applied to $V_p$, $V_n$, and/or $V_h$), light may travel through the second waveguide 115 and change or modulate from a first phase to a third phase to transmit digital data through optical signals along the second waveguide 115. When the active region 111 of the first waveguide 112 is "OFF" (e.g., voltages not applied to $V_p$, $V_n$, and/or $V_h$), light may still travel through the first waveguide 112, but no phase change occurs. Thus, the when the active region 111 of the first waveguide 112 is "OFF," light is not modulated, and the light traveling through the first exemplary light path 402 may have the same phase as the light traveling through the third exemplary light pathway 406.

Figure 7A:
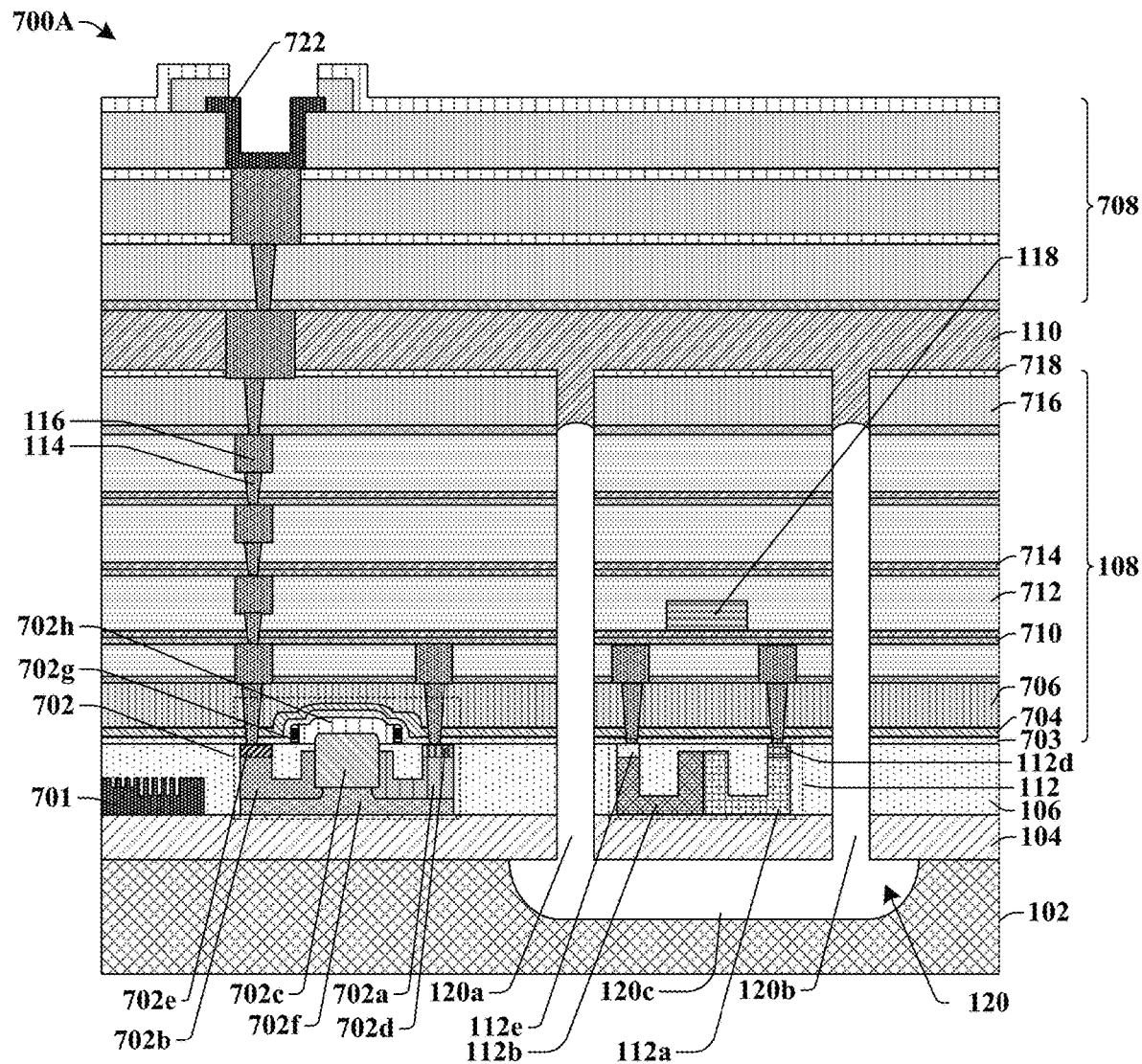
FIG. 7A illustrates a cross-sectional view of some embodiments of a modulator device comprising a photodiode, an active region of a first waveguide, a heater structure, and a gas-filled isolation structure surrounding the active region and the heater structure.

FIG. 7A illustrates a cross-sectional view 700A of some embodiments of a modulator device having a heater structure laterally surrounded by a gas-filled isolation structure, wherein a photodiode is arranged outside of the gas-filled isolation structure.

In some embodiments, the modulator device may be arranged in an integrated chip comprising other optical devices. For example, in some embodiments, a photodiode 702 and/or a grating structure 701 may be arranged over the substrate 102. The grating structure 701 may be coupled to a light source, and guide light from the light source into one or more of the devices (e.g., photodiode 702, first waveguide 112, etc.). The photodiode 702 may be configured to receive light and convert the light into a digital signal. Thus, in some embodiments, one or more photodiodes 702 may be coupled to the first waveguide 112 and/or the second waveguide (115 of FIG. 3A). The photodiode 702 and/or grating structure 701 may be arranged outside of the first and second sidewall portions 120a, 120b of the gas-filled isolation structure 120, such that heat generated by the heater structure 118 is isolated from the photodiode 702 and/or grating structure 701.

The photodiode 702 may directly contact the bulk dielectric layer 104 and be laterally surrounded by the oxide layer 106, in some embodiments. The photodiode 702 may comprise a semiconductor material and have a photodiode p-type side 702a, a photodiode n-type side 702b, and a photodiode undoped center portion 702c disposed over a photodiode contact layer 702f. In some embodiments, a photodiode p+ portion 702d may be arranged over the photodiode p-type side 702a, a photodiode n+ portion 702e may be arranged over the photodiode n-type side 702b. The photodiode p+ portion 702d and the photodiode n+ portion may be each be coupled to one of the interconnect vias 114. A first photodiode insulation layer 702h may be arranged over the photodiode undoped center portion 702c and comprise sidewall spacers 702g. In some embodiments, the photodiode p-type side 702a, photodiode n-type side 702b, and photodiode undoped center portion 702c may comprise a different semiconductor material than the first waveguide 112. For example, in some embodiments, the first waveguide 112 may comprise silicon, whereas the photodiode p-type side 702a, photodiode n-type side 702b, and photodiode undoped center portion 702c may comprise germanium.

In some embodiments, the first waveguide 112 may comprise a p+ portion 112d on the p-type side 112a, and a n+ portion 112e on the n-type side 112b. The p+ portion 112d may comprise a higher doping concentration than the p-type side 112a, and the n+ portion 112e may comprise a higher doping concentration than the n-type side 112b. Further, in some embodiments, a center undoped region (112c of FIG. 2A) of the first waveguide 112 may be omitted, such that the p-type side 112a directly contacts the n-type side 112b.

The first dielectric structure 108 may comprise many dielectric layers used for various isolation and/or patterning purposes. For example, in some embodiments, the first dielectric structure 108 may comprise a first dielectric layer 703 and a second dielectric layer 704 arranged over the oxide layer 106. The first and second dielectric layers 703, 704 may further protect the photodiode 702. A third dielectric layer 706 may be arranged over the second dielectric layer 704. In some embodiments, the third dielectric layer 706 comprises, for example, a dielectric material, such as an oxide (e.g., silicon dioxide, silicon oxynitride, etc.). A fourth dielectric layer 710 may be arranged over the third dielectric layer 706 and may act as an etch stop layer for the formation of the interconnect wires 116 and the interconnect vias 114. For example, in some embodiments, the fourth dielectric layer 710 may comprise silicon carbide. A fifth dielectric layer 712 may be arranged over the fourth dielectric layer 710. In some embodiments, the fifth dielectric layer 712 may comprise, for example, a low-k dielectric material. The heater structure 118 may be disposed over a sixth dielectric layer 714, in some embodiments, and the sixth dielectric layer 714 may comprise, in some embodiments, for example, tetraethyl orthosilicate (TEOS). A seventh dielectric layer 716 may be arranged above an upper one of the fifth dielectric layers 712. It will be appreciated that other materials for the aforementioned dielectric layers are also within the scope of this disclosure. In some embodiments, the sealing layer 110, which is arranged over the seventh dielectric layer 716 of the first dielectric structure 108, comprises first and second protrusions 110a, 110b that directly contact the fifth dielectric layer 712. In some embodiments, the seventh dielectric layer 716 may comprise a same material as the sealing layer 110, such as, for example, undoped silicate glass. Further, in some embodiments, the first and second protrusions 110a, 110b of the sealing layer 110 may have bottom surfaces that are concave down in the cross-sectional view 700A with respect to the first direction. The first dielectric structure 108 may further comprise an eighth dielectric layer 718 that is vertically between the sealing layer 110 and the seventh dielectric layer 716. In some embodiments, the eighth dielectric layer 718 comprises, for example, silicon nitride. It will be appreciated that other materials for the seventh and eighth dielectric layers 716, 718 are also within the scope of this disclosure.

In some embodiments, a second dielectric structure 708 may be arranged over the sealing layer 110. The second dielectric structure 708 may comprise, in some embodiments, layers of the fourth dielectric layer 710, the seventh dielectric layer 716, and the eighth dielectric layer 718. Further, the photodiode 702, in some embodiments, may be coupled to a contact via 722 through interconnect vias 114 and the interconnect wires 116 that extend through the first dielectric structure 108, the second dielectric structure 708, and the sealing layer 110. The contact via 722 may be arranged on the second dielectric structure 708 and be coupled to other electronic devices to transmit digital data from optical signals detected by the photodiode 702.

It will be appreciated that in addition to the configurations and materials stated above and illustrated in FIG. 7A, in some other embodiments, each of the first through eighth dielectric layers 703, 704, 706, 710, 712, 714, 716, 718 may be in various configurations and may comprise a combination of dielectric materials, such as, for example, nitride (e.g., silicon nitride, silicon oxynitride), a carbide (e.g., silicon carbide), an oxide (e.g., silicon oxide), borosilicate glass (BSG), phosphoric silicate glass (PSG), borophosphosilicate glass (BPSG), a low-k oxide (e.g., a carbon doped oxide, SiCOH), or the some other suitable material.

Figure 7B:
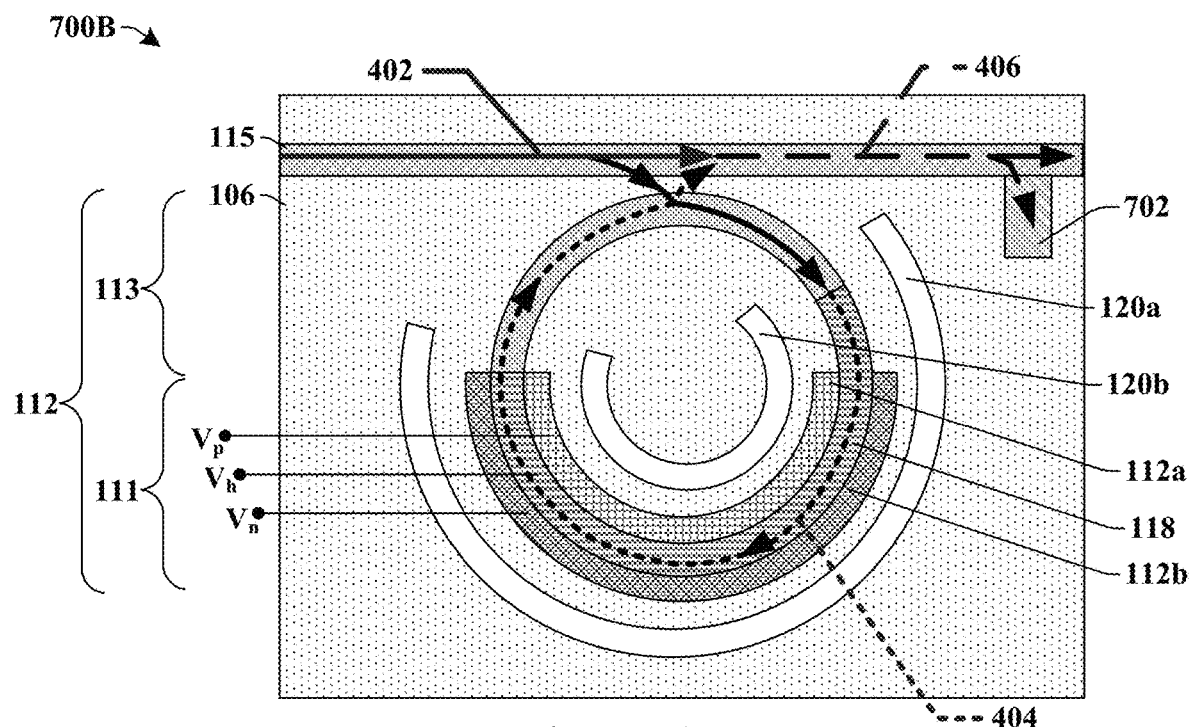
FIG. 7B illustrates a top-view of some embodiments of an exemplary light path traveling through a modulator device comprising a photodiode and a heater structure surrounded by a gas-filled isolation structure.

FIG. 7B illustrates a top-view 700B of some embodiments of exemplary light paths passing through the modulator and photodiode of FIG. 7A.

In some embodiments, the active region 111 of the first waveguide 112 is used to modulate a phase of light passing through the second waveguide 115, when the first waveguide 112 is "ON." Thus, the light may be modulated to optically transmit a signal through the second waveguide 115. In some embodiments, the photodiode 702 may be in direct contact with the second waveguide 115, for example, to detect the light having the third phase that travels along the third exemplary light pathway 406 on the second waveguide 115. Thus, the modulated light traveling along the third exemplary light pathway 406 may be detected by the photodiode 702 and converted into a digital signal by the photodiode 702. In other embodiments, more than one of photodiode 702 may be coupled to, for example, the first exemplary light pathway 402 on the second waveguide 115 and/or the first or second exemplary light pathways 402, 404 on the first waveguide 112.

FIGS. 8A, 8B, 9, 10, 11A-D, and 12-17 illustrate various views 800A, 800B, 900, 1000, 1100A-D, and 1200-1700 of some embodiments of a method of forming a gas-filled isolation structure around a heater structure in a modulator device. Although FIGS. 8A, 8B, 9, 10, 11A-D, and 12-17 are described in relation to a method, it will be appreciated that the structures disclosed in FIGS. 8A, 8B, 9, 10, 11A-D, and 12-17 are not limited to such a method, but instead may stand alone as structures independent of the method.

Figure 8A:
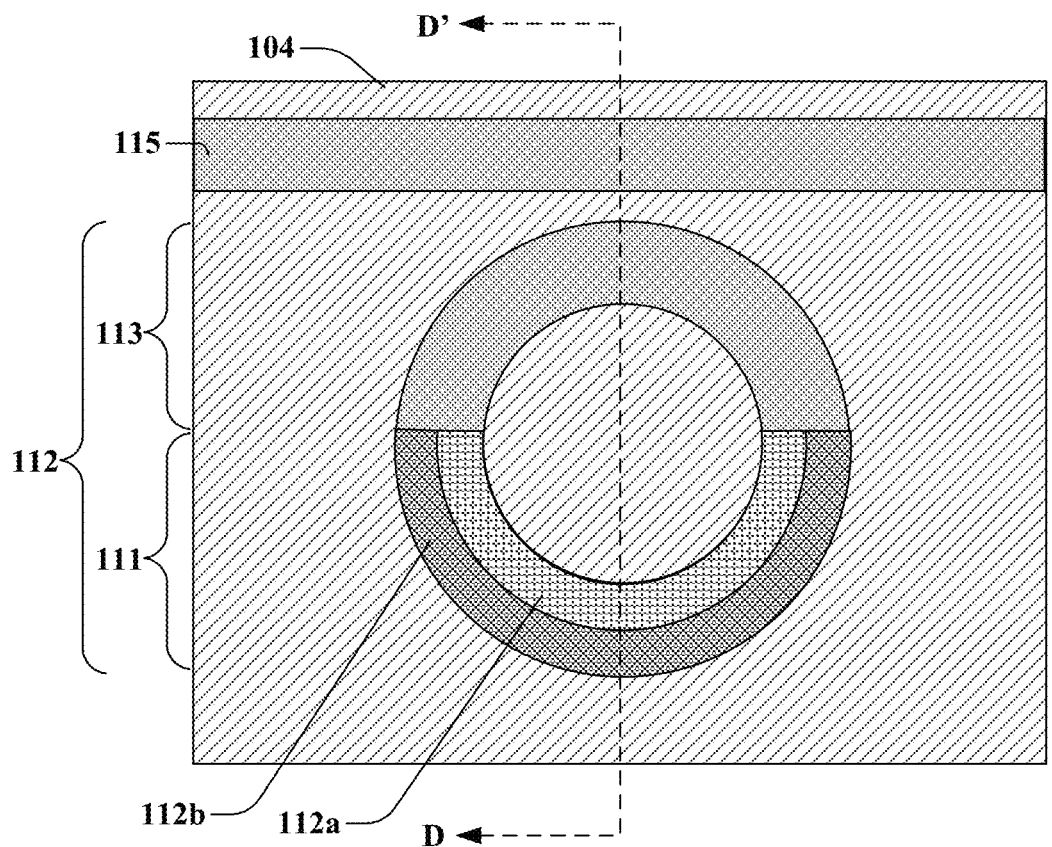
FIGS. 8A, 8B, 9, 10, 11A-D, and 12-17 illustrate various views of some embodiments of forming a gas-filled isolation structure around a heater structure in a modulator device.

As shown in top-view 800A of FIG. 8A, a first waveguide 112 and a second waveguide 115 may be formed over a bulk dielectric layer 104. The first and second waveguides 112, 115 may comprise a semiconductor material, such as silicon. An active region 111 of the first waveguide 112 may be doped to form a p/n diode, comprising a p-type side 112a and an n-type side 112b. An inactive region 113 of the first waveguide 112 may comprise an undoped semiconductor material, such as, for example, silicon. The second waveguide 115 may also, in some embodiments comprise the undoped semiconductor material, such as, for example, silicon. It will be appreciated that other materials of the first and second waveguides 112, 115 are within the scope of this disclosure. In some embodiments, the inactive region 113 of the first waveguide 112 may be optically coupled, but not directly contact the second waveguide 115. In other embodiments, the first waveguide 112 and the second waveguide 115 may be in direct contact with one another.

Figure 8B:
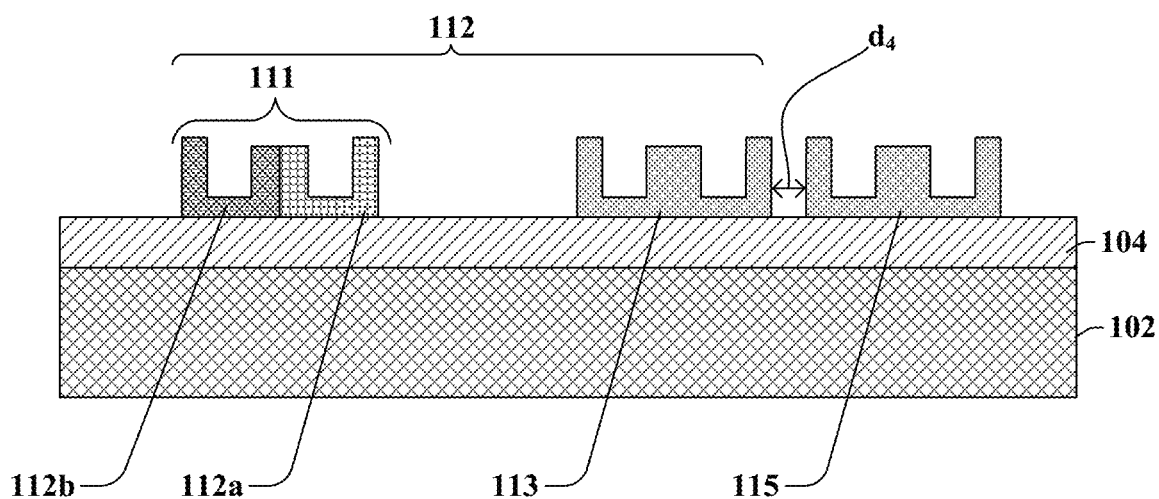

FIG. 8B illustrates some embodiments of cross-sectional view 800B corresponding to cross-section line DD' of FIG. 8A.

In some embodiments, from the cross-sectional view 800B, the first waveguide 112 has a same structure in the active region 111 and the inactive region 113. However, the active region comprises the p-type side 112a and the n-type side 112b, whereas the inactive region 113 comprises an undoped semiconductor material. In some embodiments, the second waveguide 115 may have a same structure as the inactive region 113 of the first waveguide 112. In some embodiments where the first waveguide 112 does not directly contact the second waveguide 115, the smallest distance between the first and second waveguides 112, 115 is equal to a fourth distance $d_4$. The fourth distance $d_4$ is small enough such that the first and second waveguides 112, 115 are optically coupled to one another.

In some embodiments, the first and second waveguides 112, 115 are arranged over a bulk dielectric layer 104, which is arranged over a substrate 102. In some embodiments, the bulk dielectric layer 104 comprises an oxide, such as silicon dioxide having a thickness in a range of between, for example, approximately 1.5 micrometers and approximately 2.5 micrometers. It will be appreciated that other values for the thickness of the bulk dielectric layer 104 are also within the scope of this disclosure. In other embodiments, the bulk dielectric layer 104 may comprise some other dielectric material such as a low-k oxide (e.g., a carbon doped oxide, SiCOH), a nitride (e.g., silicon nitride), or the like. The substrate 102 may be a semiconductor substrate and comprise, for example, silicon or germanium.

Figure 9:
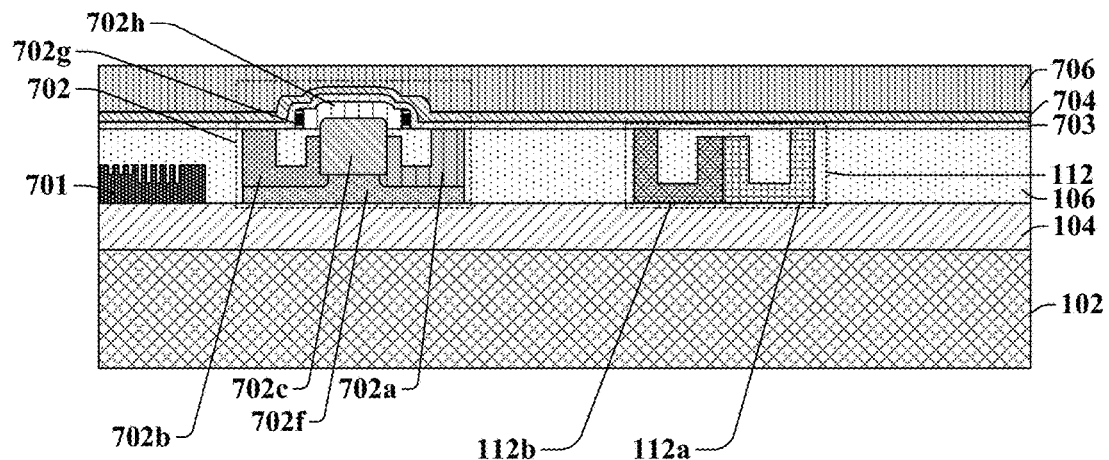

As shown in cross-sectional view 900 of FIG. 9, in some embodiments, various optical devices may be formed over the bulk dielectric layer 104. For example, a photodiode 702 may be formed laterally beside the first waveguide 112. The photodiode 702 may comprise a photodiode p-type side 702a, a photodiode n-type side 702b, and a photodiode undoped center portion 702c disposed over a photodiode contact layer 702f. A first photodiode insulation layer 702h may be arranged over the photodiode undoped center portion 702c and comprise sidewall spacers 702g. The first photodiode insulation layer 702h may comprise silicon nitride, in some embodiments, and a have a thickness in a range of between, for example, approximately 850 angstroms and approximately 950 angstroms. It will be appreciated that other materials and thickness values of the first photodiode insulation layer 702h are also within the scope of this disclosure. In some embodiments, the photodiode p-type side 702a, photodiode n-type side 702b, and photodiode undoped center portion 702c may comprise a different semiconductor material than the first waveguide 112. For example, in some embodiments, the first waveguide 112 may comprise silicon, whereas the photodiode p-type side 702a, photodiode n-type side 702b, and photodiode undoped center portion 702c may comprise germanium. Further, a grating structure 701 may also be arranged over the bulk dielectric layer 704. In some embodiments, the grating structure 701 may comprise an optically reflective material, such as, for example, aluminum, aluminum copper, silver, gold, or some other suitable material.

After optical devices (e.g., photodiode 702, grating structure 701, etc.) have been formed over the bulk dielectric layer 104, an oxide layer 106 is deposited over the bulk dielectric layer 104 and over the optical devices, the first waveguide 112, and the second waveguide (115 of FIG. 8B). In some embodiments, the oxide layer 106 comprises, for example, silicon dioxide and has a thickness in a range of between, for example, approximately 2.5 kiloangstroms and approximately 3.5 kiloangstroms. It will be appreciated that the first photodiode insulation layer 702h and the sidewall spacers 702g may be formed after the formation of the oxide layer 106.

A first dielectric structure (108 of FIG. 7A) may be formed over the oxide layer 106. In some embodiments, the first dielectric structure (108 of FIG. 7A) is formed first by depositing a second dielectric layer 704 over a first dielectric layer 703 on the oxide layer 106. A third dielectric layer 706 may be deposited over the second dielectric layer 704. In some embodiments, the third dielectric layer 706 comprises a dielectric material, such as, for example, a nitride (e.g., silicon nitride, silicon oxynitride), a carbide (e.g., silicon carbide), an oxide (e.g., silicon oxide), borosilicate glass (BSG), phosphoric silicate glass (PSG), borophosphosilicate glass (BPSG), a low-k oxide (e.g., a carbon doped oxide, SiCOH), or the like. The third dielectric layer 706 may have a maximum thickness in a range of between, for example, approximately 3 kiloangstroms and approximately 3.5 kiloangstroms.

Figure 10:
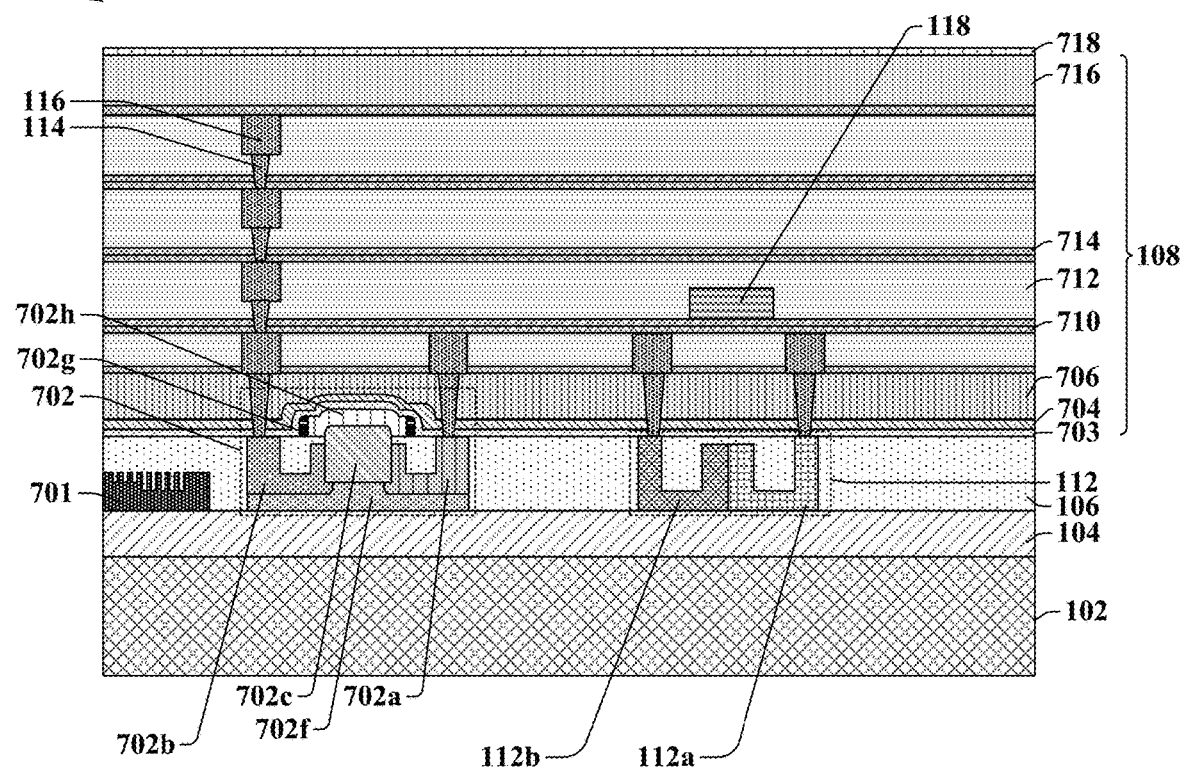

As shown in cross-sectional view 1000 of FIG. 10, lowermost interconnect vias 114 may be formed by patterning the first, second, and third dielectric layers 703, 704, 706 using patterning (e.g., photolithography), removal (e.g., etching, chemical mechanical planarization), and deposition (e.g., physical vapor deposition (PVD), chemical vapor deposition (CVD), PE-CVD, atomic layer deposition (ALD), sputtering, etc.) processes, for example.

A fourth dielectric layer 710 may then be deposited over the third dielectric layer 706, and a fifth dielectric layer 712 may be deposited over the fourth dielectric layer 710. In some embodiments, the fourth dielectric layer 710 comprises silicon carbide and has a thickness in a range of between, for example, approximately 325 angstroms and approximately 525 angstroms. In some embodiments, the fifth dielectric layer 712 may comprise a low-k dielectric (e.g., silicon nitride, silicon oxynitride, silicon dioxide, BPSG, PSG, BSG, carbon doped oxide, SiCOH, or the like), and may have a thickness in a range of between, for example, approximately 1.3 kiloangstroms and approximately 2.9 kiloangstroms. Lowermost interconnect wires 116 may be formed by conducting patterning processes on the fourth and fifth dielectric layers 710, 712 followed by depositing processes. In some embodiments, the interconnect vias 114 and the interconnect wires 116 may comprise a conductive material such as, for example, aluminum, tungsten, copper, or the like.

Another fourth dielectric layer 710 may be deposited over the fifth dielectric layer 712, and a sixth dielectric layer 714 may be deposited over the fourth dielectric layer 710. In some embodiments, the sixth dielectric layer 714 comprises TEOS and has a thickness in a range of between, for example, approximately 300 angstroms and approximately 350 angstroms. In some embodiments, the heater structure 118 may be formed over the sixth dielectric layer 714. The heater structure 118 may comprise, for example, titanium nitride, tantalum nitride, tungsten, doped silicon, silicide, or the like. It will be appreciated that other materials of the heater structure 118 are also within the scope of this disclosure. The heater structure 118 may be formed by a deposition (e.g., PVD, CVD, PE-CVD, ALD, sputtering, etc.), patterning (e.g., photolithography) and/or removal (e.g., etching, CMP) processes.

After the heater structure 118 is formed, more interconnect vias 114 and wires 116 are formed through fourth, fifth, and sixth dielectric layers 710, 712, 714. In some embodiments, the interconnect vias 114 and interconnect wires 116 are formed using a dual damascene process, for example. After multiple interconnect vias 114 and interconnect wires 116 are formed above the heater structure 118, a seventh dielectric layer 716 may be deposited over an upper one of the fifth dielectric layers 712, and an eighth dielectric layer 718 may be deposited over the seventh dielectric layer 716. The seventh dielectric layer 716 may comprise, for example, undoped silicate glass, and have a thickness in a range of between, for example, approximately 4 kiloangstroms and approximately 6 kiloangstroms. The eighth dielectric layer 718 may comprise, for example, silicon nitride, and have a thickness in a range of between, for example approximately 400 angstroms and approximately 500 angstroms. It will be appreciated that other materials and thickness values for the aforementioned dielectric layers are also within the scope of this disclosure.

Figure 11A:
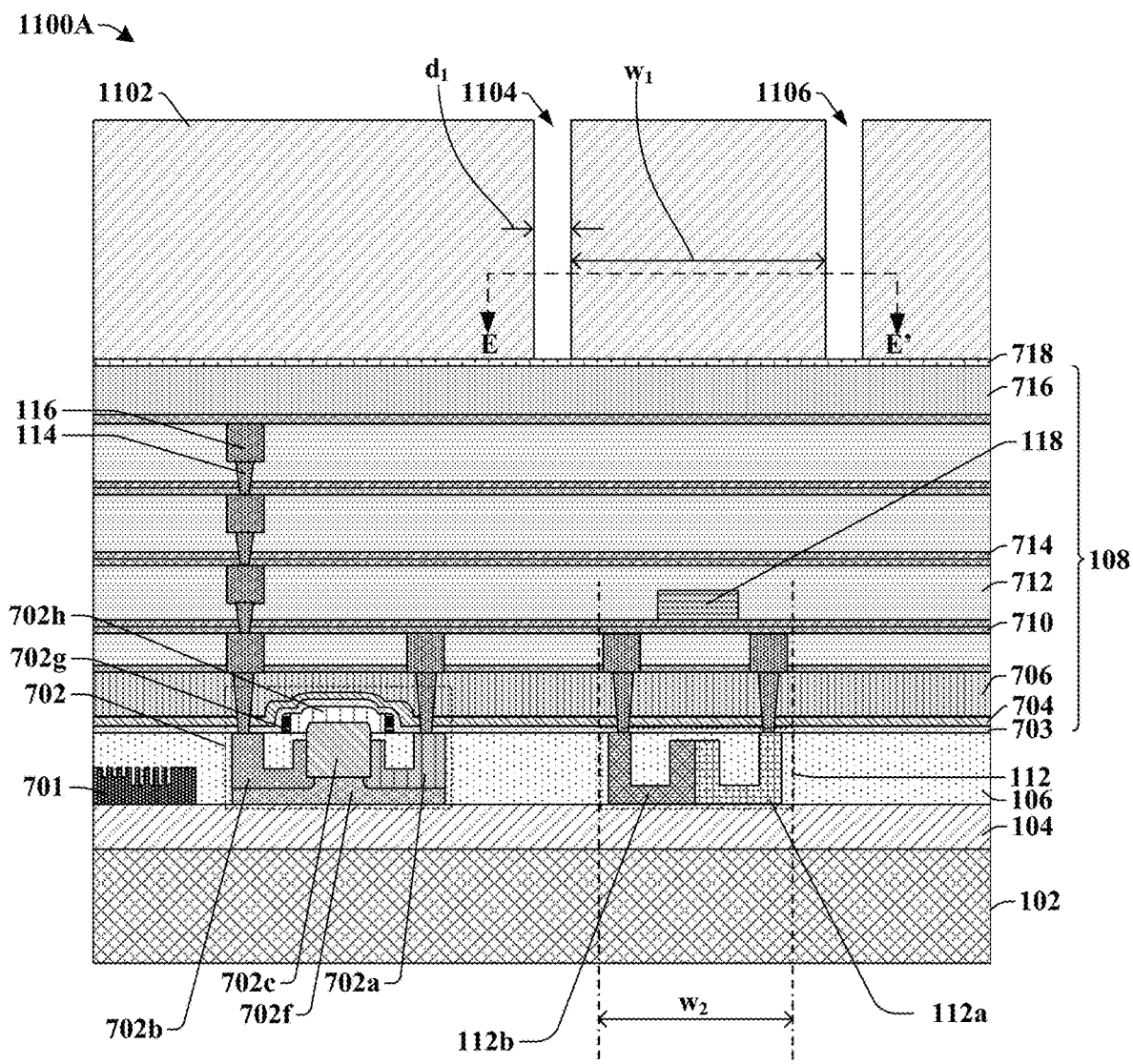

As shown in cross-sectional view 1100A of FIG. 11A, a first masking layer 1102 may be formed over the eighth dielectric layer 718. The first masking layer 1102 may comprise a photoresist material, for example, and be patterned using photolithography and removal (e.g., etching) processes, such that the first masking layer 1102 comprises a first opening 1104 and a second opening 1106. The first and second openings 1104, 1106 may each have a width equal to a first distance $d_1$. In some embodiments, the first distance $d_1$ may be equal to at most 0.5 micrometers. It will be appreciated that other values of the first distance $d_1$ are also within the scope of this disclosure. Further, the first waveguide 112 may have an active region (111 of FIG. 8A) and the heater structure 118 that are arranged between the first and second openings 1104, 1106, such that the first and second openings 1104, 1106 do not directly overlie the active region (111 of FIG. 8A) of the first waveguide 112 or the heater structure 118.

Further, in some embodiments, the first and second openings 1104, 1106 may be separated from one another by a first width $w_1$. The first width $w_1$ is greater than a second width $w_2$, wherein the second width $w_2$ is equal to the width of the active region (111 of FIG. 8A) of the first waveguide 112.

Figure 11B:
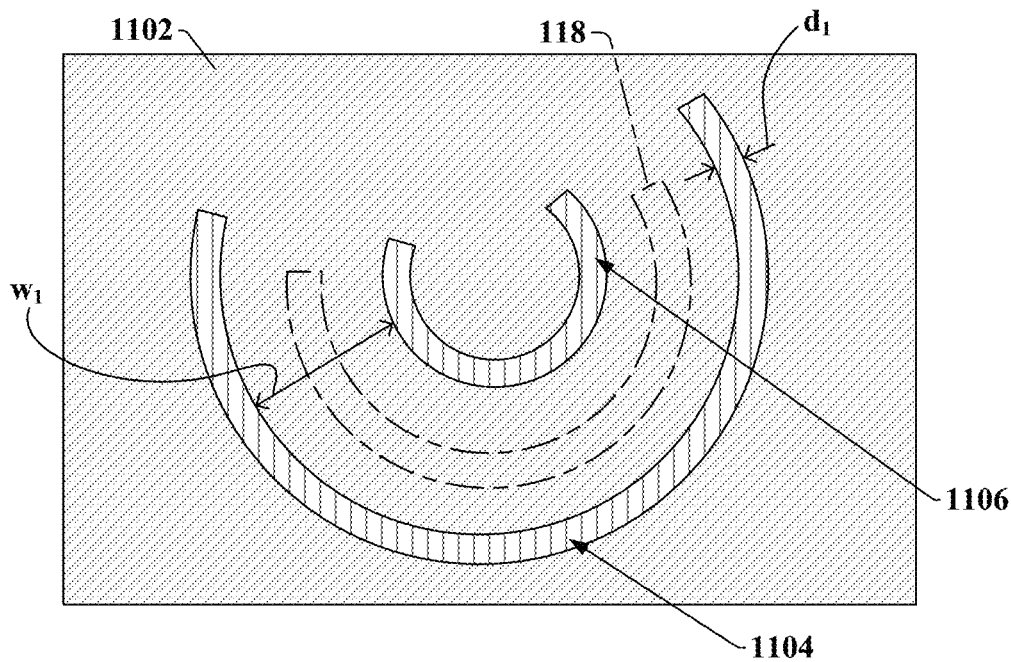
Figure 11C:
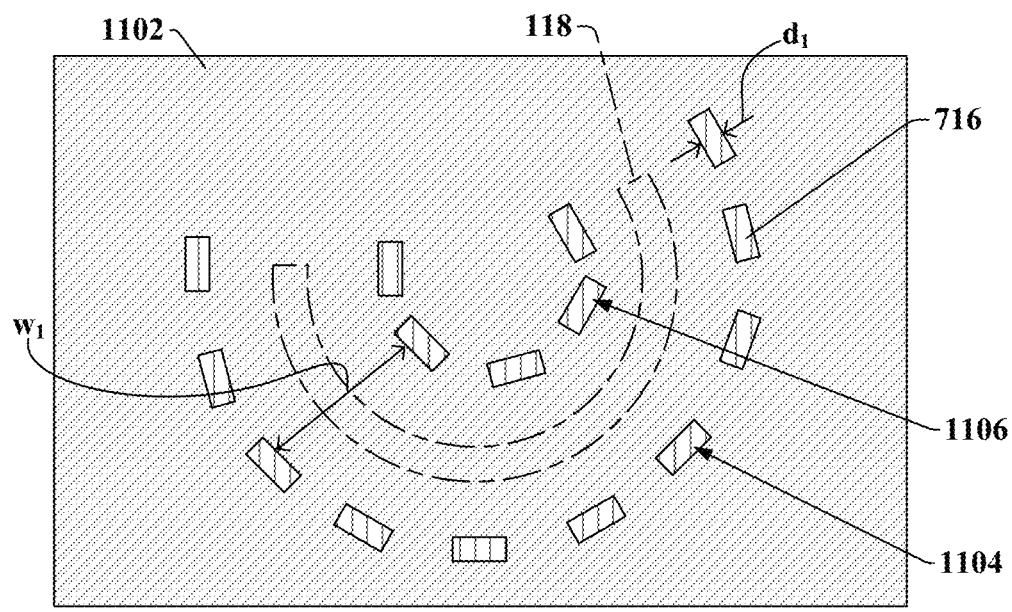
Figure 11D:
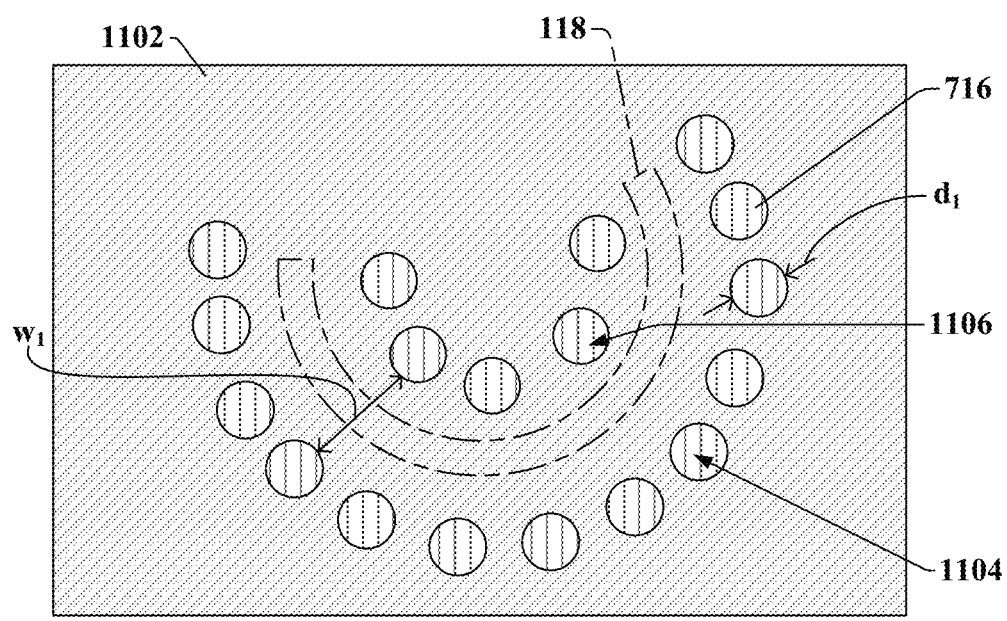

FIGS. 11B-11D illustrate top-views 1100B-110E of some embodiments corresponding to cross-section line EE' of FIG. 11A.

As shown in the top-view 1100B of FIG. 11B, in some embodiments, the first opening 1104 is a continuously connected opening on a first side of the heater structure 118, and the second opening is a continuously connected opening on a second side of the heater structure 118.

As shown in the top-view 1100C of FIG. 11C, in some embodiments, the first opening 1104 comprises multiple rectangular-shaped openings from a top-view perspective on a first side of the heater structure 118. Further, in some embodiments, the second opening 1106 comprises multiple rectangular-shaped openings from a top-view perspective on a second side of the heater structure 118.

As shown in the top-view 1100D of FIG. 11D, in some embodiments, the first opening 1104 comprises multiple circular-shaped openings from a top-view perspective on a first side of the heater structure 118. Further, in some embodiments, the second opening 1106 comprises multiple circular-shaped openings from a top-view perspective on a second side of the heater structure 118.

Figure 12:
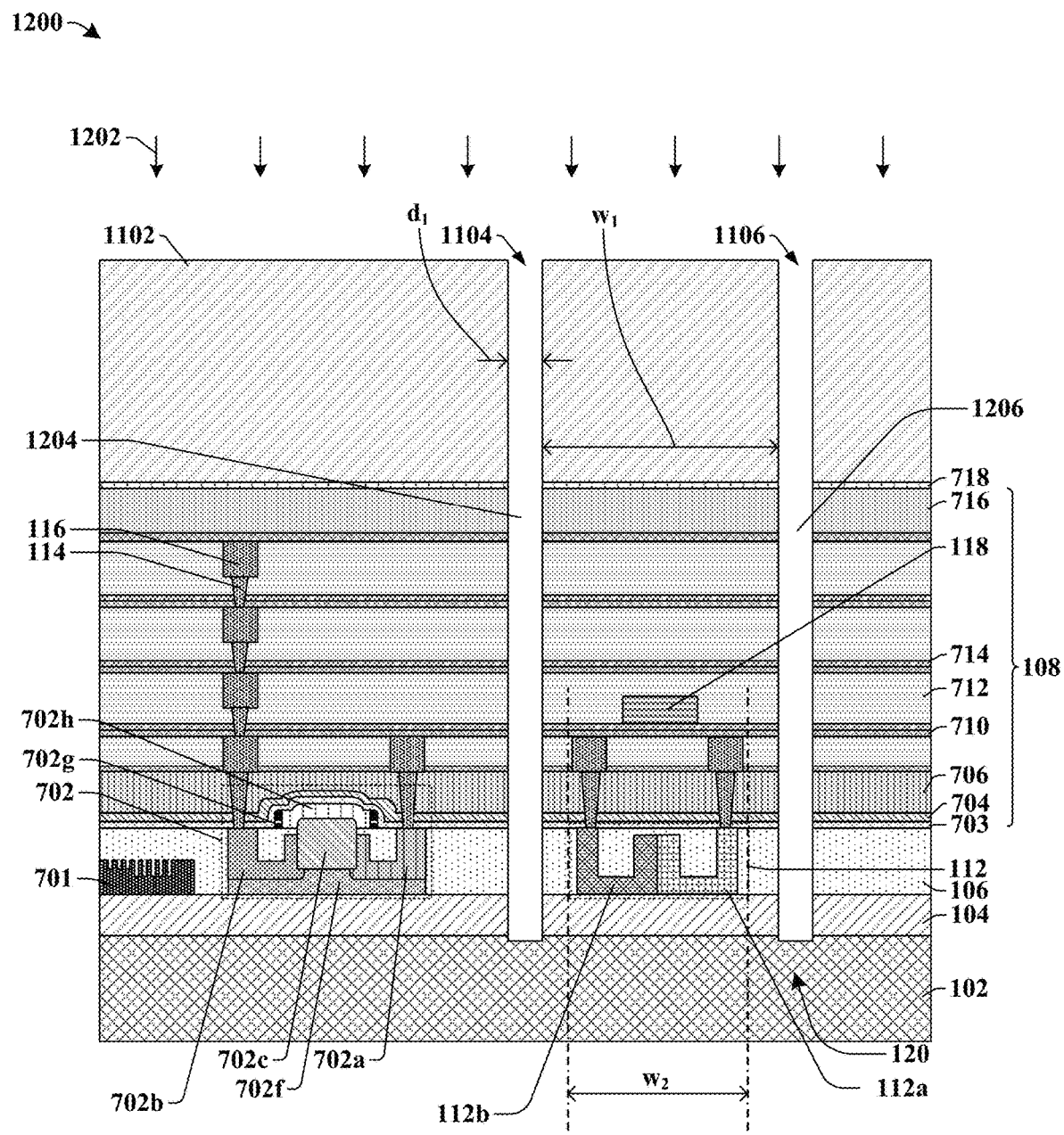

As shown in cross-sectional view 1200 of FIG. 12, a first etching process 1202 is performed to form a first trench 1204 and a second trench 1206 through the first dielectric structure 108 and into the substrate 102, wherein the first trench 1204 and the second trench 1206 are formed according to and thus, directly underlie the first and second openings 1104, 1106 of the first masking layer 1102. In some embodiments, the first etching process 1202 may be or comprise a dry etching process and use a plasma etchant, such as, for example, a fluoride based gas (e.g., carbon-fluoride, sulfur hexafluoride). The first etching process 1202 may be conducted in a substantially vertical direction. In some embodiments, the first and second trenches 1204, 1206 extend into the substrate 102, but do not extend completely through the substrate 102. Further, the first and second trenches 1204, 1206 do not interfere with, or in other words, intersect with the first waveguide 112, the second waveguide (115 of FIG. 8A), the heater structure 118, or any of the optical devices (e.g., photodiode 702, grating structure 701).

Figure 13:
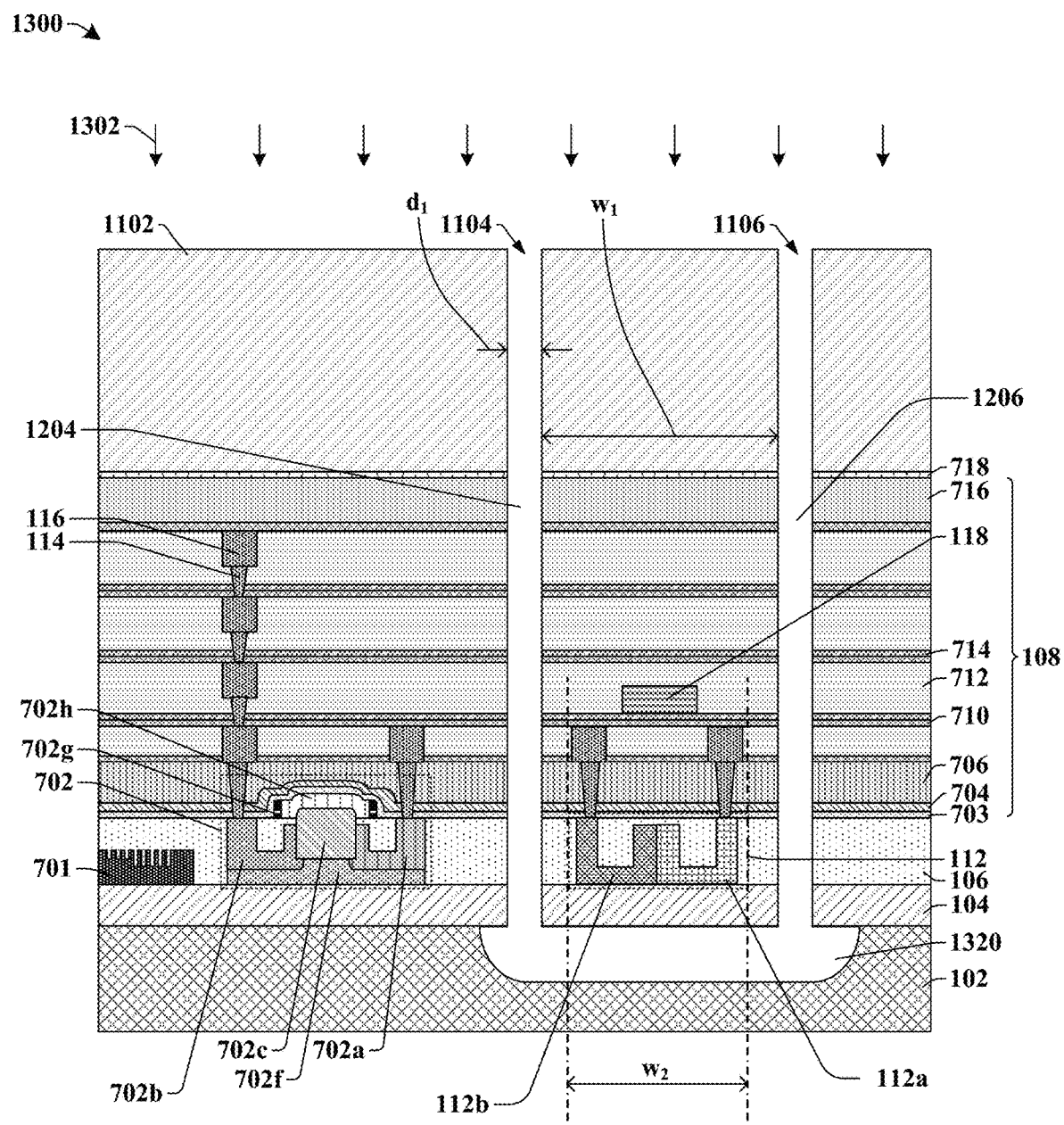

As shown in cross-sectional view 1300 of FIG. 13, a second etching process 1302 is performed in some embodiments, to remove portions of the substrate 102 such that a first cavity 1320 connects the first trench 1204 and the second trench 1206. The first masking layer 1102 may remain over the first dielectric structure 108 during the second etching process 1302. The second etching process 1302 may be or comprise a dry etching process and may use a vapor chemical etchant (e.g., xenon difluoride) or a plasma etchant, such as, for example, a fluoride based gas (e.g., sulfur hexafluoride). Thus, in some embodiments, the second etching process 1302 uses the same etchant as the first etching process (1202 of FIG. 12). In other embodiments, the second etching process 1302 may use a different etchant than the first etching process (1202 of FIG. 12). To form the first cavity 1320 in both the vertical and lateral directions, the second etching process 1302 may be or comprise an isotropic etching process. In some embodiments, the second etchant of the second etching process 1302 removes portions of the substrate 102, but does not remove any of the bulk dielectric layer 104. In other embodiments (not shown), portions of the bulk dielectric layer 104 may be removed as a residual effect of the second etching process 1302.

In other embodiments (e.g., FIG. 2B), although the formation of the first cavity 1320 may aid in thermal efficiency of the final device, the second etching process 1302, and thus, the first cavity 1320 may be omitted to increase manufacturing efficiency. In such other embodiments, the method would continue from FIG. 12 to FIG. 14, thereby skipping the second etching process 1302 of FIG. 13.

Figure 14:
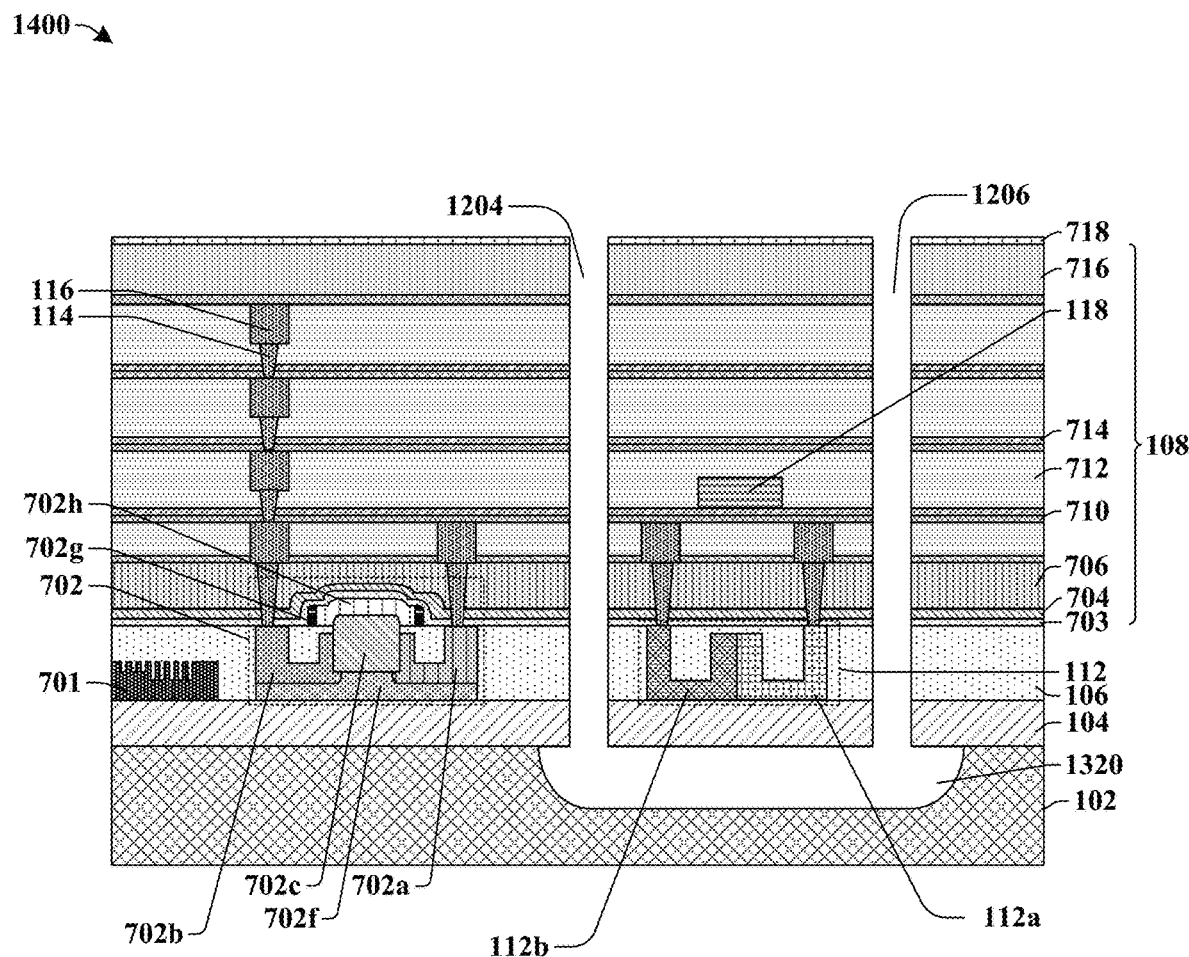

As shown in cross-sectional view 1400 of FIG. 14, the first masking layer (1102 of FIG. 13) may be removed, for example, using a wet etchant. In some embodiments, the eighth dielectric layer 718 substantially protects the underlying first dielectric structure 108 from the removal of the first masking layer (1102 of FIG. 13).

Figure 15:
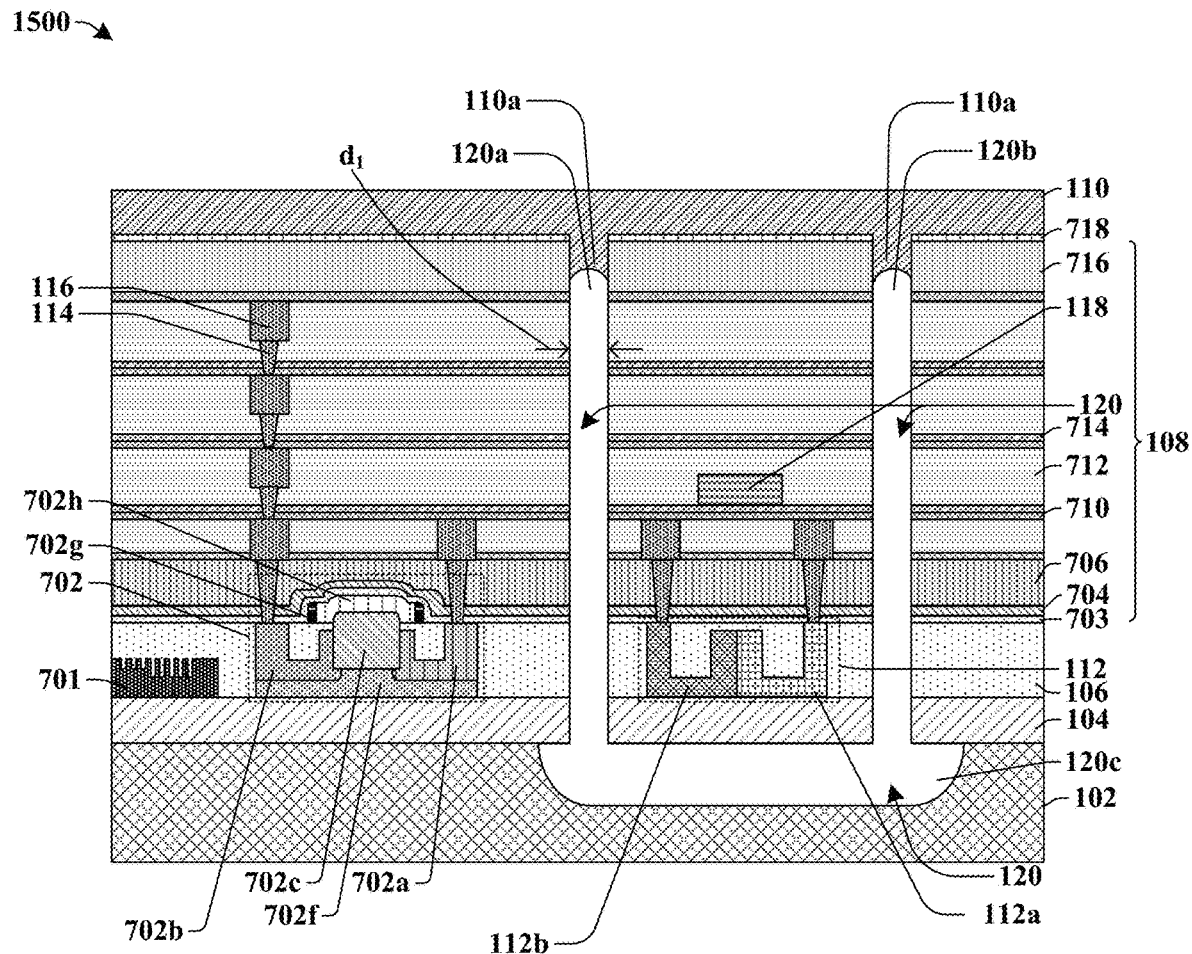

As shown in cross-sectional view 1500 of FIG. 15, a sealing layer 110 may be formed over the eighth dielectric layer 718 to seal the first trench (1204 of FIG. 14), the second trench (1206 of FIG. 14), and in some embodiments, the first cavity (1320 of FIG. 14) to form a gas-filled isolation structure 120 filled with air and comprising a first sidewall portion 120a, a second sidewall portion 120b, and in some embodiments, a lower portion 120c. The sealing layer 110 may comprise, in some embodiments, an oxide, such as undoped silicate glass, tetraethyl orthosilicate (TEOS), a polyethylene oxide, or some other suitable oxide, for example. It will be appreciated that other materials for the sealing layer 110 are also within the scope of this disclosure. In some embodiments, the sealing layer 110 is formed by a deposition process (e.g., PVD, CVD, PE-CVD, ALD, sputtering, etc.). A first protrusion 110a of the sealing layer 110 may form in the first trench (1204 of FIG. 14), and a second protrusion 110b of the sealing layer 110 may form in the second trench (1206 of FIG. 14). However, the first and second protrusions 110a, 110b of the sealing layer 110 do not extend below an upper surface of the heater structure 118 because the first distance $d_1$ of the first and second trenches (1204, 1206 of FIG. 15) are at most equal to about 0.5 micrometers. If the first and second trenches (1204, 1206 of FIG. 15) were larger than about 0.5 micrometers, more growth of the sealing layer 110 may occur within the first and second trenches (1204, 1206 of FIG. 15), possibly filling the first and second trenches (1204, 1206 of FIG. 15) and preventing the formation of the first and second sidewall portions 120a, 120b of the gas-filled isolation structure 120. In some embodiments, after the deposition of the sealing layer 110, a removal process (e.g., CMP) may be performed such that the sealing layer 110 has a substantially planar upper surface. The sealing layer 110 effectively seals the gas-filled isolation structure 120 so that the gas-filled isolation structure 120 may confine heat generated by the heater to the first waveguide 112 to efficiently modulate light traveling through the first waveguide 112.

Figure 16:
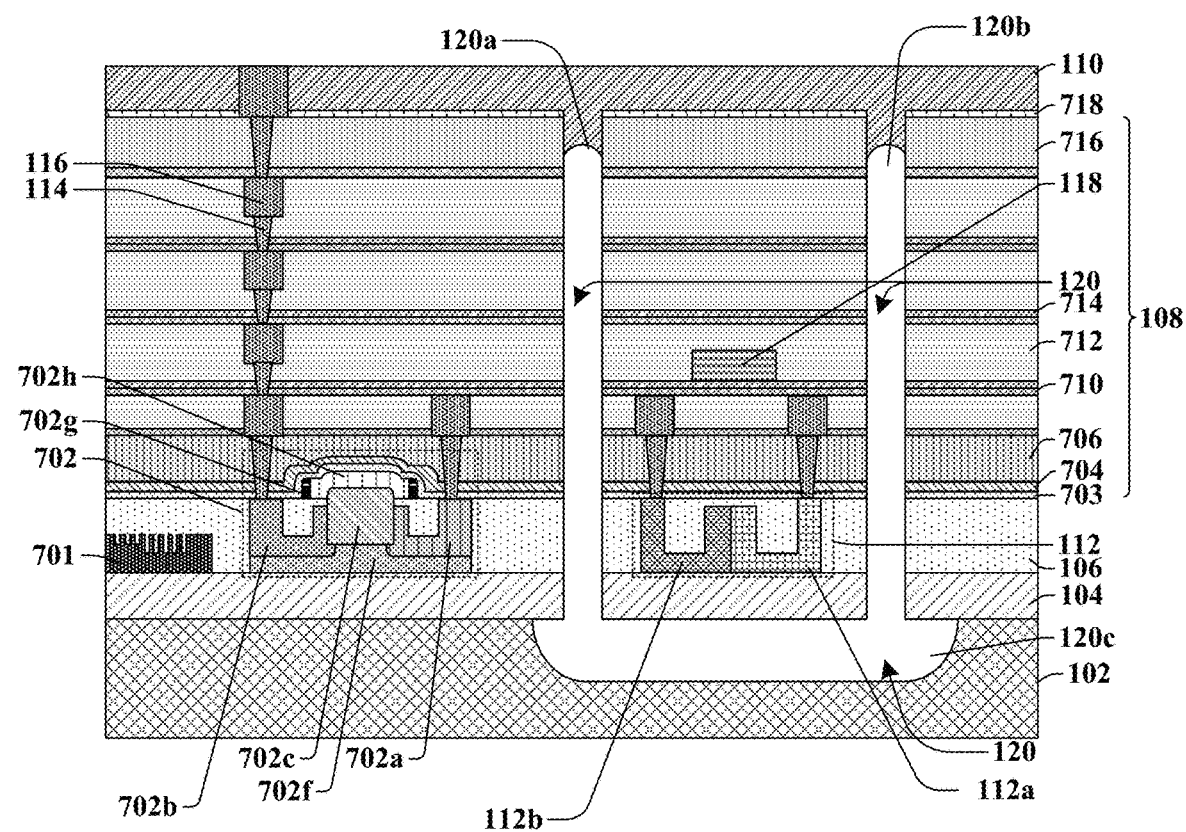

As shown in cross-sectional view 1600 of FIG. 16, additional interconnect vias 114 and interconnect wires 116 may be formed through the seventh dielectric layer 716, the eighth dielectric layer 718, and the sealing layer 110. The interconnect vias 114 and the interconnect wires 116 may be formed using a dual damascene process.

Figure 17:
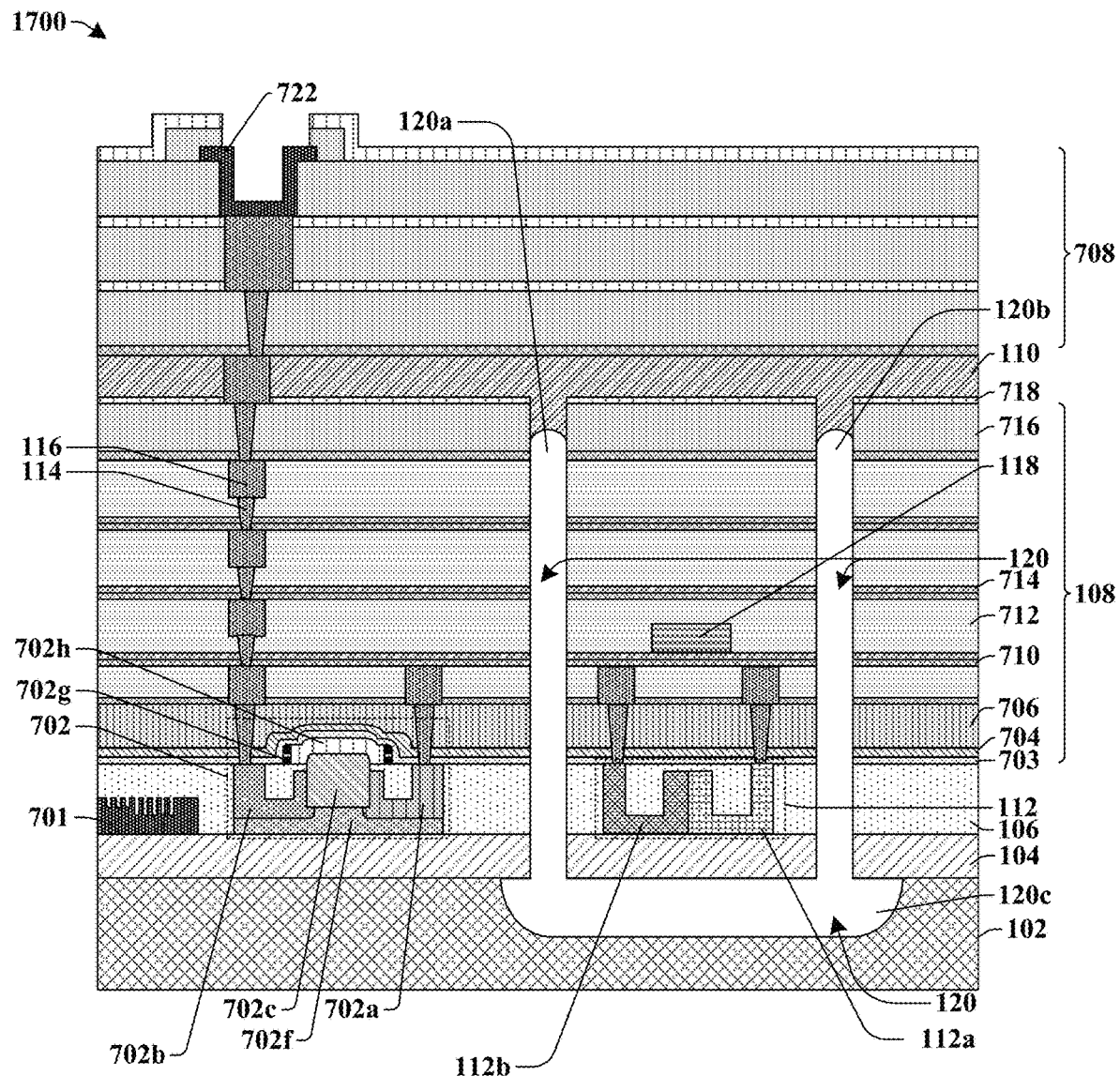

As shown in cross-sectional view 1700 of FIG. 17, additional interconnect vias 114 and interconnect wires 116 may be formed in a second dielectric structure 708 disposed over the sealing layer 110. In some embodiments, the second dielectric structure 708 comprises the fourth, seventh, and eighth dielectric layers 710, 716, 718, for example. Further, in some embodiments, a contact via 722 may be coupled to, for example, the photodiode 702 through the interconnect vias and wires 114, 116 such that the photodiode 702 can transmit digital data from optical signals (e.g., light) traveling through the first waveguide 112 and/or second waveguide (320 of FIG. 8A).

Figure 18:
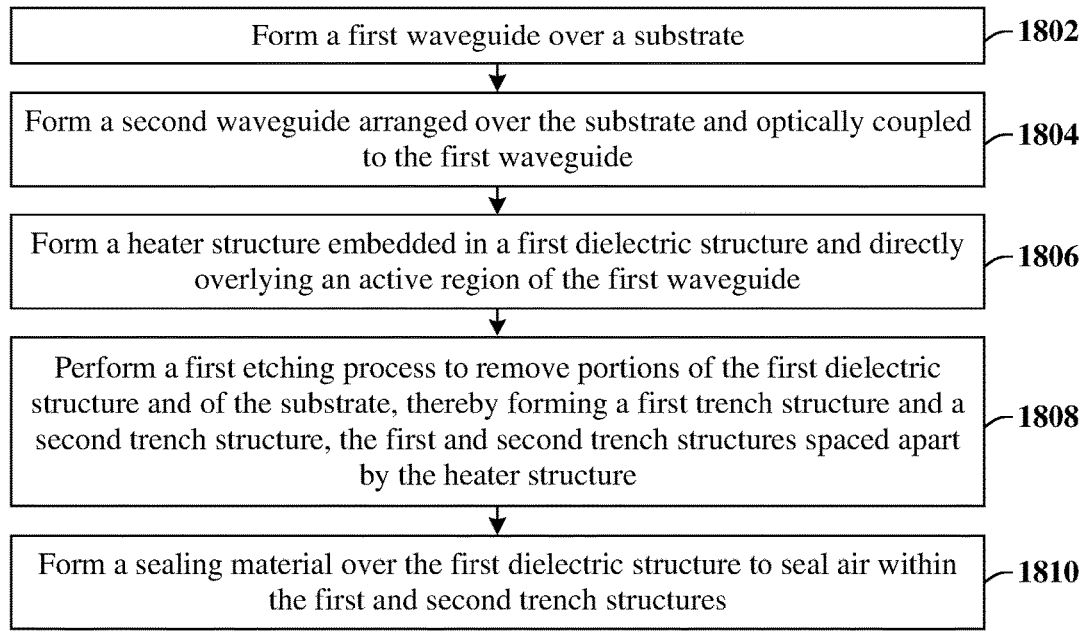
FIG. 18 illustrates a flow diagram of some embodiments corresponding to the method of FIGS. 8A, 8B, 9, 10, 11A-D, and 12-17.

FIG. 18 illustrates a flow diagram of some embodiments of a method 1800 of forming a modulator device comprising a gas-filled isolation structure that surrounds a heater structure.

While method 1800 is illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the description herein. Further, one or more of the acts depicted herein may be carried out in one or more separate acts and/or phases.

At act 1802, a first waveguide is formed over a substrate.

At act 1804, a second waveguide is formed over the substrate and optically coupled to the first waveguide. FIGS. 8A and 8B respectively illustrate a top-view 800A and a cross-sectional view 800B of some embodiments corresponding to acts 1802 and 1804.

At act 1806, a heater structure embedded in a first dielectric structure is formed, wherein the heater structure directly overlies an active region of the first waveguide. FIG. 10 illustrates a cross-sectional view 1000 of some embodiments corresponding to act 1806.

At act 1808, a first etching process is performed to remove portions of the first dielectric structure and of the substrate, thereby forming a first trench structure and a second trench structure, the first and second trench structures spaced apart by the heater structure. FIG. 12 illustrates a cross-sectional view 1200 of some embodiments corresponding to act 1808.

At act 1810, a sealing material is formed over the first dielectric structure to seal air within the first and second trench structures. FIG. 15 illustrates a cross-sectional view 1500 of some embodiments corresponding to act 1810.

Therefore, the present disclosure relates to a method of manufacturing a modulator device comprising a gas-filled isolation structure surrounding a heater structure to increase thermal efficiency and decrease power consumption of the modulator device during operation of the heater structure.

Accordingly, in some embodiments, the present disclosure relates to a modulator device comprising: an input terminal configured to receive impingent light; a first waveguide having a first input region and a first output region, the first input region being coupled to the input terminal; a second waveguide optically coupled to the first waveguide, the second waveguide having a second input region and a second output region, the second input region being coupled to the input terminal; an output terminal configured to provide outgoing light that is modulated based on the impingent light, the output terminal being coupled to the first output region of the first waveguide and the second output region of the second waveguide; a heater structure proximate to the first waveguide, and configured to provide heat to the first waveguide to induce a temperature difference between the first waveguide and the second waveguide based on a data state to be transmitted by the modulator device; and a gas-filled isolation structure proximate to the heater structure and configured to thermally isolate the second waveguide from the heat provided to the first waveguide.

In other embodiments, the present disclosure relates to a modulator device comprising: a first waveguide arranged over a substrate and comprising an active region configured to modulate light; a second waveguide arranged over the substrate and optically coupled to the first waveguide; a first dielectric structure arranged over the first and second waveguides; a heater structure embedded within the first dielectric structure and directly overlying the active region of the first waveguide; a gas-filled isolation structure embedded within the first dielectric structure, wherein the substrate defines bottom surfaces of the gas-filled isolation structure, wherein the gas-filled isolation structure comprises a first sidewall portion on a first side of the heater structure and a second sidewall portion on a second side of the heater structure, and wherein the active region of the first waveguide and the heater structure are between the first and second sidewall portions of the gas-filled isolation structure; and a sealing layer that seals the gas-filled isolation structure and defines topmost surfaces of the gas-filled isolation structure.

In yet other embodiments, the present disclosure relates to a method for forming a modulator device, the method comprising: forming a first waveguide over a substrate; forming a second waveguide arranged over the substrate and optically coupled to the first waveguide; forming a heater structure directly overlying an active region of the first waveguide, wherein the heater structure is embedded in a first dielectric structure; performing a first etching process to remove portions of the first dielectric structure and the substrate, thereby forming a first trench structure and a second trench structure that extend completely through the first dielectric structure and into a top surface of the substrate, wherein the first and second trench structures are spaced apart by the heater structure; and forming a sealing material over the first dielectric structure, wherein the sealing material seals air within the first and second trench structures.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A modulator device comprising:
an input terminal configured to receive impingent light;
a first waveguide arranged over a substrate and having a first input region and a first output region, the first input region being coupled to the input terminal;
a second waveguide arranged over the substrate and optically coupled to the first waveguide, the second waveguide having a second input region and a second output region, the second input region being coupled to the input terminal;
an output terminal configured to provide outgoing light that is modulated based on the impingent light, the output terminal being coupled to the first output region of the first waveguide and the second output region of the second waveguide;
a proximate device arranged over the substrate and laterally beside the first waveguide;
a heater structure proximate to the first waveguide, and configured to provide heat to the first waveguide to induce a temperature difference between the first waveguide and the second waveguide based on a data state to be transmitted by the modulator device;
a gas-filled isolation structure proximate to the heater structure; and
a sealing layer arranged over the gas-filled isolation structure, wherein a bottommost surface of the sealing layer defines a top surface of the gas-filled isolation structure, wherein the bottommost surface of the sealing layer is arranged above a topmost surface of the heater structure, wherein the gas-filled isolation structure comprises a first sidewall portion extending from the bottommost surface of the sealing layer to the substrate and comprises a second sidewall portion extending from the bottommost surface of the sealing layer to the substrate, wherein the heater structure and the first waveguide are arranged directly between the first and second sidewall portions of the gas-filled isolation structure, wherein the first and second sidewall portions of the gas-filled isolation structure are configured to shield the proximate device and the second waveguide from the heat generated by the heater structure, wherein the gas-filled isolation structure comprises a lower portion that is connected to the first and second sidewall portions and that directly underlies the first waveguide, and wherein the bottommost surface of the sealing layer is arranged above a topmost surface of the proximate device.

2. The modulator device of claim 1, wherein the first waveguide comprises an active region including a p-type region and an n-type region, and wherein it is the active region of the first waveguide that is arranged directly between the first and second sidewall portions of the gas-filled isolation structure.

3. The modulator device of claim 1, wherein the input terminal and the output terminal are collinear along a line and lie within a plane, and the first waveguide and second waveguide lie within the plane and branch symmetrically from the input terminal before rejoining one another at the output terminal.

4. The modulator device of claim 1, wherein the input terminal and the output terminal are collinear along a line and lie within a plane, the second waveguide lies within the plane and extends linearly along the line between the input terminal and the output terminal, and the first waveguide lies within the plane and comprises a circular path of waveguide material at one side of the second waveguide.

5. The modulator device of claim 1, wherein the proximate device comprises a photodiode.

6. The modulator device of claim 1, wherein the bottommost surface of the sealing layer is concave up with respect to a coordinate system having a first axis extending along a topmost surface of the substrate and a second axis that is normal to the topmost surface of the substrate.

7. A modulator device comprising:
a first semiconductor device arranged over a substrate;
a first waveguide arranged over the substrate and comprising an active region configured to modulate light;
a second waveguide arranged over the substrate and optically coupled to the first waveguide;
a first dielectric structure arranged over the first and second waveguides;
a heater structure embedded within the first dielectric structure and directly overlying the active region of the first waveguide;
a gas-filled isolation structure embedded within the first dielectric structure, wherein the substrate defines bottom surfaces of the gas-filled isolation structure, wherein the gas-filled isolation structure comprises a first sidewall portion on a first side of the heater structure and a second sidewall portion on a second side of the heater structure, and wherein the active region of the first waveguide and the heater structure are between the first and second sidewall portions of the gas-filled isolation structure; and
a sealing layer that seals the gas-filled isolation structure and defines topmost surfaces of the gas-filled isolation structure,
wherein a bottommost surface of the sealing layer is arranged below a topmost surface of the first dielectric structure and above a topmost surface of the heater structure, and wherein the first and second sidewall portions of the gas-filled isolation structure are configured to shield the first semiconductor device from heat generated by the heater structure,
wherein the gas-filled isolation structure comprises a lower portion that extends from the first sidewall portion of the gas-filled isolation structure to the second sidewall portion of the gas-filled isolation structure, wherein the lower portion of the gas-filled isolation structure is directly between the active region of the first waveguide and the substrate, and
wherein the bottommost surface of the sealing layer is arranged above a topmost surface of the first semiconductor device.

8. The modulator device of claim 7, wherein the sealing layer comprises:
a first protrusion having a bottom surface that defines a topmost surface of the first sidewall portion of the gas-filled isolation structure, and wherein the bottom surface of the first protrusion is below the topmost surface of the first dielectric structure; and
a second protrusion having a bottom surface that defines a topmost surface of the second sidewall portion of the gas-filled isolation structure, and wherein the bottom surface of the second protrusion is below the topmost surface of the first dielectric structure.

9. The modulator device of claim 8, wherein the bottom surface of the first protrusion is concave up with respect to a coordinate system having a first axis extending along a topmost surface of the substrate and a second axis that is normal to the topmost surface of the substrate.

10. The modulator device of claim 7, wherein from a top-view perspective, the gas-filled isolation structure comprises multiple rectangular cavities, wherein the rectangular cavities are separated from one another by the first dielectric structure.

11. The modulator device of claim 7, wherein from a top-view perspective, the gas-filled isolation structure comprises a plurality of circular cavities, wherein the circular cavities are separated from one another by the first dielectric structure.

12. The modulator device of claim 7, wherein the first sidewall portion of the gas-filled isolation structure is not fluidly connected to the second sidewall portion of the gas-filled isolation structure.

13. The modulator device of claim 7,
wherein the first semiconductor device comprises a photodiode.

14. A method for forming a modulator device, the method comprising:
forming a first semiconductor device over a substrate;
forming a first waveguide over the substrate;
forming a second waveguide arranged over the substrate and optically coupled to the first waveguide;
forming a heater structure directly overlying an active region of the first waveguide, wherein the heater structure is embedded in a first dielectric structure;
performing a first etching process to remove portions of the first dielectric structure and the substrate, thereby forming a first trench structure and a second trench structure that extend completely through the first dielectric structure and into a top surface of the substrate, wherein the first and second trench structures are spaced apart by the heater structure;
performing a second etching process through the first and second trench structures to remove portions of the substrate thereby forming a third trench structure that connects the first and second trench structures; and
forming a sealing material over the first dielectric structure, wherein the sealing material seals air within the first and second trench structures to form a gas-filled isolation structure comprising a first sidewall portion defined by the first trench structure and the sealing material and comprising a second sidewall portion defined by the second trench structure and the sealing material, wherein the heater structure is arranged directly between the first and second sidewall portions, wherein the first and second sidewall portions are configured to shield the first semiconductor device from heat generated by the heater structure, wherein a bottommost surface of the sealing material is arranged above a topmost surface of the heater structure, and wherein the bottommost surface of the sealing material is arranged above a topmost surface of the first semiconductor device.

15. The method of claim 14, wherein the active region of the first waveguide comprises a p/n diode.

16. The method of claim 14, wherein the first etching process is a plasma dry etching process, and wherein the first etching process comprises a fluoride based gas.

17. The method of claim 16, wherein the second etching process is an isotropic etching process and comprises a plasma etchant or a vapor chemical etchant.

18. The method of claim 14, wherein the bottommost surface of the sealing material is arranged below a topmost surface of the first dielectric structure.

19. The method of claim 14, wherein the bottommost surface of the sealing material is concave up with respect to a coordinate system having a first axis extending along the top surface of the substrate and a second axis that is normal to the top surface of the substrate.

20. The method of claim 14, wherein the first semiconductor device comprises a photodiode.

* * * * *